US008075297B2

(12) United States Patent
Correia

(10) Patent No.: US 8,075,297 B2
(45) Date of Patent: Dec. 13, 2011

(54) METHOD AND APPARATUS FOR ARTIFICIALLY AGING PRE-CAST BLOCKS

(75) Inventor: Horacio Correia, Lachenaie (CA)

(73) Assignee: Rinox Inc., Terrebonne, Quebec (CA)

( * ) Notice: Subject to any disclaimer, the term of this patent is extended or adjusted under 35 U.S.C. 154(b) by 0 days.

(21) Appl. No.: 11/915,429

(22) PCT Filed: Jun. 2, 2006

(86) PCT No.: PCT/CA2006/000911

§ 371 (c)(1),
(2), (4) Date: Nov. 26, 2007

(87) PCT Pub. No.: WO2006/136009

PCT Pub. Date: Dec. 28, 2006

(65) Prior Publication Data

US 2008/0211138 A1 Sep. 4, 2008

(30) Foreign Application Priority Data

Jun. 2, 2005 (CA) ..................................... 2509064
Sep. 7, 2005 (CA) ..................................... 2518188

(51) Int. Cl.
*B28B 11/10* (2006.01)
*B29B 11/08* (2006.01)

(52) U.S. Cl. ....................................... 425/328; 264/293

(58) Field of Classification Search .................. 425/340, 425/343, 385, 402, 403, 328, 304, 313
See application file for complete search history.

(56) References Cited

U.S. PATENT DOCUMENTS

| | | | | |
|---|---|---|---|---|
| 4,419,065 A | 12/1983 | Cox | |
| 5,133,915 A * | 7/1992 | Metten et al. | 264/162 |
| 6,540,501 B1 * | 4/2003 | Bott | 425/385 |
| 6,832,879 B2 * | 12/2004 | Wassmer | 409/197 |
| 7,063,284 B2 * | 6/2006 | Modesti et al. | 241/197 |
| 2003/0214069 A1 | 11/2003 | Suto et al. | |
| 2006/0112946 A1 | 6/2006 | Kitahara | |

FOREIGN PATENT DOCUMENTS

| | | |
|---|---|---|
| BE | 1 014 894 A3 | 6/2004 |
| CA | 2350979 | 5/2002 |
| CA | 2343338 | 10/2002 |

(Continued)

OTHER PUBLICATIONS

European Search Report: EP 06 79 0520.

*Primary Examiner* — Katarzyna Wyrozebski Lee
*Assistant Examiner* — Daniel Lee
(74) *Attorney, Agent, or Firm* — Ladas & Parry LLP

(57) ABSTRACT

A method and apparatus for modifying the surface texture of pre-cast building blocks including a pressure-applying device so positioned as to selectively engage blocks and being adapted to apply a pressure on the surface of blocks so as to modify their texture thereof prior to the curing of the blocks. Also disclosed is an apparatus for modifying the surface texture of pre-cast building blocks including mechanisms and structures adapted to provide a plurality of longitudinal movements and a plurality of rotational movements to adjust the direction of the wearing tool in respect to the alignment of the blocks when modifying the surface texture of these blocks as well as a block-stabilizing device for stabilizing blocks during surface-texture modification operations.

10 Claims, 24 Drawing Sheets

FOREIGN PATENT DOCUMENTS

| | | | |
|---|---|---|---|
| CA | 2392934 | | 1/2004 |
| CA | 2 463 406 | A1 | 10/2004 |
| DE | 103 49 529 | A1 | 5/2005 |
| EP | 0816031 | | 1/1998 |
| EP | 1211036 | | 6/2002 |
| JP | 04175106 | | 6/1992 |
| JP | 04194202 | | 7/1992 |
| JP | 09242004 | | 9/1997 |
| JP | 11042627 | | 2/1999 |
| WO | 2004/078441 | | 9/2004 |

* cited by examiner

METHOD AND APPARATUS FOR ARTIFICIALLY AGING PRE-CAST BLOCKS

CROSS-REFERENCE TO RELATED APPLICATIONS

This application is a US national phase completion of International Patent Appln. No. PCT/CA2006/000911, which claims priority to Canadian Patent Application No. 2,509,064 filed on Jun. 2, 2005, U.S. patent application Ser. No. 11/144,193 filed on Jun. 3, 2005, and Canadian Patent Application No. 2,518,188 filed on Sep. 7, 2005.

FIELD OF THE INVENTION

The present invention relates to a method and apparatus for modifying the texture of a block. More specifically, the present invention is concerned with a method and apparatus for modifying the texture of a block before curing. The present invention also relates to a block spacer for spacing a plurality of blocks and a block stabilizer for stabilizing blocks during surface-texture modification operations.

BACKGROUND OF THE INVENTION

Devices for artificially aging blocks are well known in the art. Some of the prior art included block tumblers; these devices though were inadequate because of the loss of much block material, which raised production costs. Improvements were on-line devices where blocks were conveyed under or through impacting devices for surface modification, deformation, chipping etc. thereof.

Conventional block-conveying systems include a support table for moving the blocks thereon as they are acted on during texture surface modification. The following are examples of block-texture modifying apparatuses.

Canadian Patent Application No. 2,343,338 teaches an apparatus for roughing the surfaces of concrete casted blocks. A roller having chains attached thereon and spaced apart from one another is provided above blocks that are being supported on a moveable table. The support table has a flat upper surface. The support table includes holes through which pins are projected in order to tilt the bottom surface of the blocks hence tilting the whole blocks at predetermined locations in order for the chain to impact the blocks on their upper surface at different locations.

Canadian Patent Application No. 2,350,979 teaches a system for modifying the texture of blocks. The system includes texturing elements that are on support cables which spin and which are brought closer to the block in order to bring the texturing elements in contact with the block for impacting the surface. The texturing elements can be moved at different angles in order to impact the block's surfaces in different areas during the translational movement of the block.

Canadian Patent Application No. 2,392,934 teaches a concrete texture machine for modifying the surface texture of stone blocks. The machine conveys concrete blocks at a pitching station having opposed pitching blades. Each of the blades have a forward projecting cutting edge that are displaced towards and away from one another at predetermined distances.

European Patent Application No. 1211036 teaches a device for artificially aging stones. This device includes top and bottom rollers with mangling elements that engage the edges of the stones and are passed therebetween in order to break and mangles these edges.

A limitation of these prior art apparatuses is that they do not provide for the blocks to be spaced apart at a constant distance when acting on them. Furthermore, these prior art apparatuses are inconvenient for acting on the edges of the blocks.

Japanese Patent Application No. 04194202 teaches a spacer which functions to create a gap between mutual blocks in order to make it look wide in external appearance. The spacer is used for the construction of the blocks. All the documents referred above are included herewith by reference.

The spacers and positioning mechanisms of the prior art are not constructed for modifying pre-cast blocks.

Hence, the prior art teaches chains on a spinning longitudinal member to impact the surface of concrete blocks; rollers for engaging the edges of blocks as well as spacers for building and laying concrete blocks are also known.

A general limitation of the prior art is that it does not provide an apparatus and method for maintaining the block that provides easy access to the block edges so as to act thereon as well as various block-texture modifying actions that modify these edges accordingly.

A drawback of such devices is that high pressure must be applied on these blocks.

There thus remains a need for an improved apparatus and method for modifying the surface texture of blocks.

SUMMARY OF THE INVENTION

More specifically, in accordance with the present invention there is provided a method for modifying the surface texture of pre-cast building blocks, said method comprising: (a) pressing cementitious material within a mould into pre-cast blocks; (b) applying pressure on the surface of pre-cast blocks obtained in step (a) so as to modify the texture thereof; and (c) providing for curing of pre-cast blocks obtained in step (b).

In an embodiment, the method further comprises after step (c), (d) applying pressure on the surface of pre-cast blocks after curing so as to further modify the texture thereof. In an embodiment, step (b) comprises applying pressure on the top edges of pre-cast blocks. In an embodiment, said pressure in step (b) is applied via a pressure-applying member. In an embodiment, said pressure applying member comprises a longitudinal rod member. In an embodiment, said longitudinal rod member comprises ridges on its outer surface. In an embodiment, said pressure in step (b) is applied via air-pressure. In an embodiment, said pressure is step (d) is applied by a block-texture modifying device. In an embodiment, said step (b) creates weak areas on the surface of blocks. In an embodiment, pressure in step (d) is applied on said weak areas.

In accordance with another aspect of the invention there is provided an apparatus for modifying the surface texture of pre-cast building blocks, said apparatus comprising a support for supporting blocks thereon, a pressure-applying device so positioned as to selectively engage blocks on said support, wherein said pressure-applying device is so adapted as to apply a pressure on the surface of blocks so as to modify the texture thereof before curing of said blocks.

In an embodiment, the apparatus further comprises a translational movement-imparting device from imparting a translation movement between blocks on said support and said pressure-applying device. In an embodiment, the translational movement imparting device comprises a push member, said push member comprising a block-engaging member and being connected to an actuator for translational movement thereof. In an embodiment, said translational movement imparting device comprises a conveyor for translationally conveying said support with blocks thereon. In an embodiment, said pressure-applying device is moveable between a block engaging position and a block disengaging position. In an embodiment, said pressure-applying device is adjacent to a press and mould apparatus for pressing cementitious material into pre-cast blocks, said pressure-applying device being so positioned as to engage the surface of blocks after said pressing. In an embodiment, said pressure applying device comprises a longitudinal rod member. In an embodiment, said longitudinal rod member comprises ridges on its outer surface. In an embodiment, said pressure applying device comprises a lateral rod member. In an embodiment, said longitudinal rod member comprises ridges on its outer surface. In an embodiment, said pressure-applying device comprises longitudinal members and lateral members crossing said longitudinal members so as to form individual generally rectangular members for engaging the edged perimeter of blocks. In an embodiment, said longitudinal and lateral members comprise respective rod members having ridges on their respective outer surfaces. In an embodiment, said pressure-applying device comprises an air blower for applying air pressure on blocks. In an embodiment, the apparatus further comprises a block-texture modifying device for further modifying the surface texture of blocks after both initial modification of blocks by said pressure-applying device and curing thereof.

In accordance with a further aspect of the invention, there is provided a spacer for spacing adjacent blocks apart at a pre-determined distance when modifying the surface texture of these blocks, said spacer comprising spacing elements for placing between adjacent blocks.

In an embodiment, said spacing elements comprises crossed members defining individual areas for receiving a given block therethrough. In an embodiment, said spacing elements are so configured as to expose the top and bottom edges of blocks. In an embodiment, said spacing elements are of a substantially equal thickness, said receiving areas being of substantially equal sizes. In an embodiment, said spacer comprises peripheral enclosing members for enclosing a plurality of blocks therein. In an embodiment, said enclosing elements are so configured as to expose the top and bottom edges of blocks. In an embodiment, said spacer comprises four peripheral enclosing members defining a generally rectangular shape, longitudinal spacing members extending between said peripheral enclosing members, said spacing members extending between one pair of opposite enclosing members crossing said spacing members extending between another pair of opposite enclosing members thereby defining individual receiving areas, each said receiving areas are configured for receiving a block therein.

In accordance with yet another aspect of the present invention, there is provided block-stabilizing device for stabilizing blocks during surface-texture modification operations, said device comprising a plurality of stabilizing members for respectively engaging a portion of block surfaces thereby exposing another portion of block surfaces, wherein each said stabilizing member exerts sufficient pressure on a block so as to substantially avoid movement thereof during surface-texture modification operations on said exposed block surface portion.

In an embodiment, each of said stabilizing members comprises a plaque in an embodiment, said plaques are mounted to supports. In an embodiment, said supports are mounted to actuators so at to move said plaques between block engaging and disengaging positions. In an embodiment, said exposed block surface portion comprises the edge perimeter of blocks.

In another embodiment, a block-stabilizing device for stabilizing blocks during surface-texture modification operations is provided, said device comprising a plurality of stabilizing members for respectively engaging a portion of block surfaces thereby exposing another portion of block surfaces, wherein each said stabilizing member exerts sufficient pressure on a block so as to substantially avoid movement thereof during surface-texture modification operation on said exposed block surface portion.

Another embodiment provides an apparatus for modifying the surface texture of pre-cast building blocks the apparatus comprising a primary frame defining a longitudinal axis between a forward portion and a rearward portion, a tool holder, defining a tool holder axis, moveably connected to the frame, a first motor supported by the frame for displacing the tool holder along the longitudinal axis, and a second motor supported by the frame for rotating a wearing tool about a wearing tool axis, the wearing tool supported by the tool holder and adapted to rotate about the tool holder axis.

An advantage of the present invention is that it provides a method and apparatus for modifying the surface texture of blocks using less pressure than prior art devices and methods.

Other objects, advantages and features of the present invention will become more apparent upon reading of the following non-restrictive description of embodiments thereof, given by way of example only with reference to the accompanying drawings.

DESCRIPTION OF EMBODIMENTS OF THE INVENTION

With reference to the appended drawings an embodiment of the invention will be herein described so as to exemplify the invention and not limit its scope.

Figure 1:
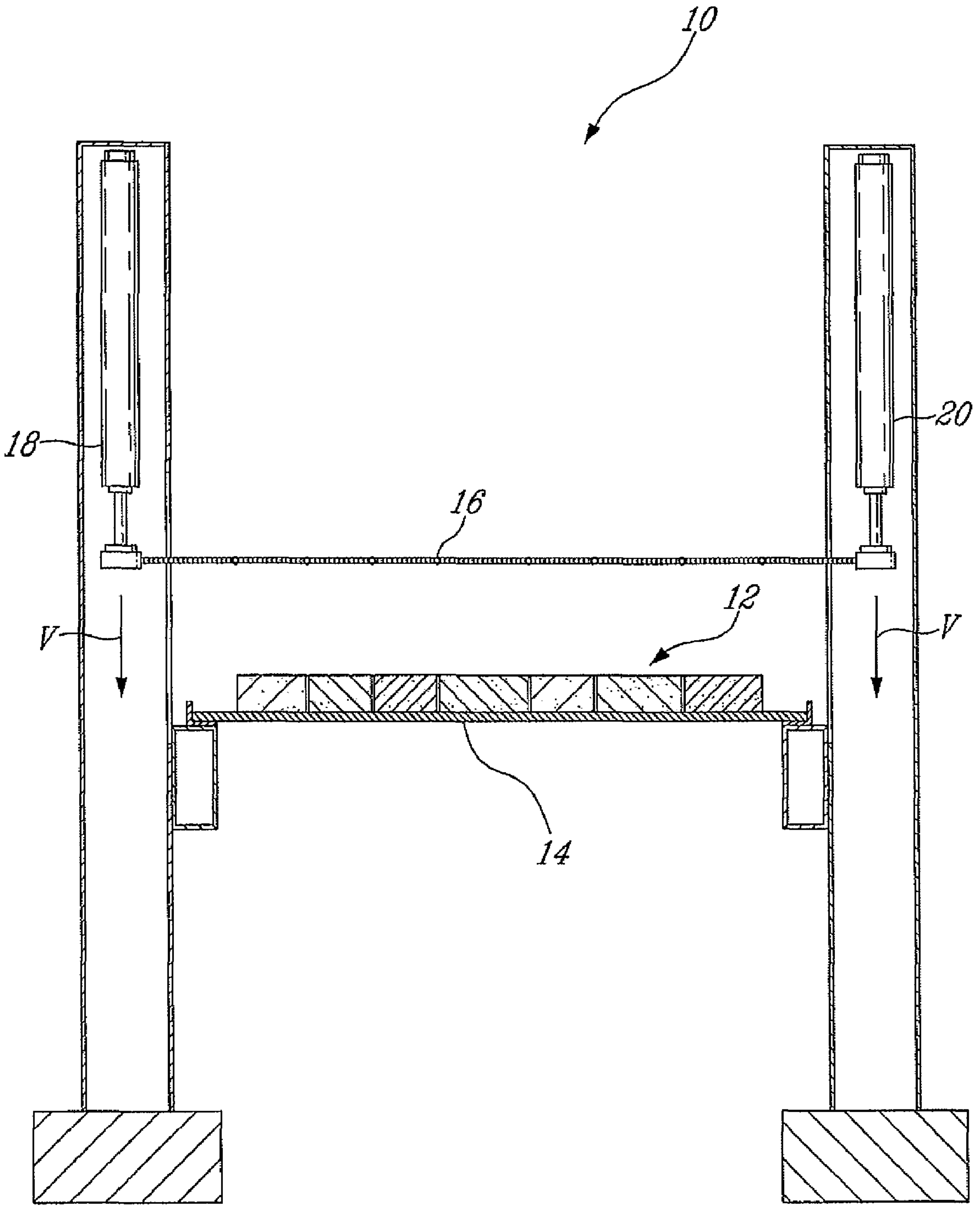
FIG. 1 is front elevational view of the apparatus for modifying the surface texture of pre-cast building blocks in accordance with an embodiment of the present invention.

FIG. 1 shows an apparatus 10 for modifying the surface texture of pre-cast building blocks 12 which are mounted on a support 14.

Figure 2:
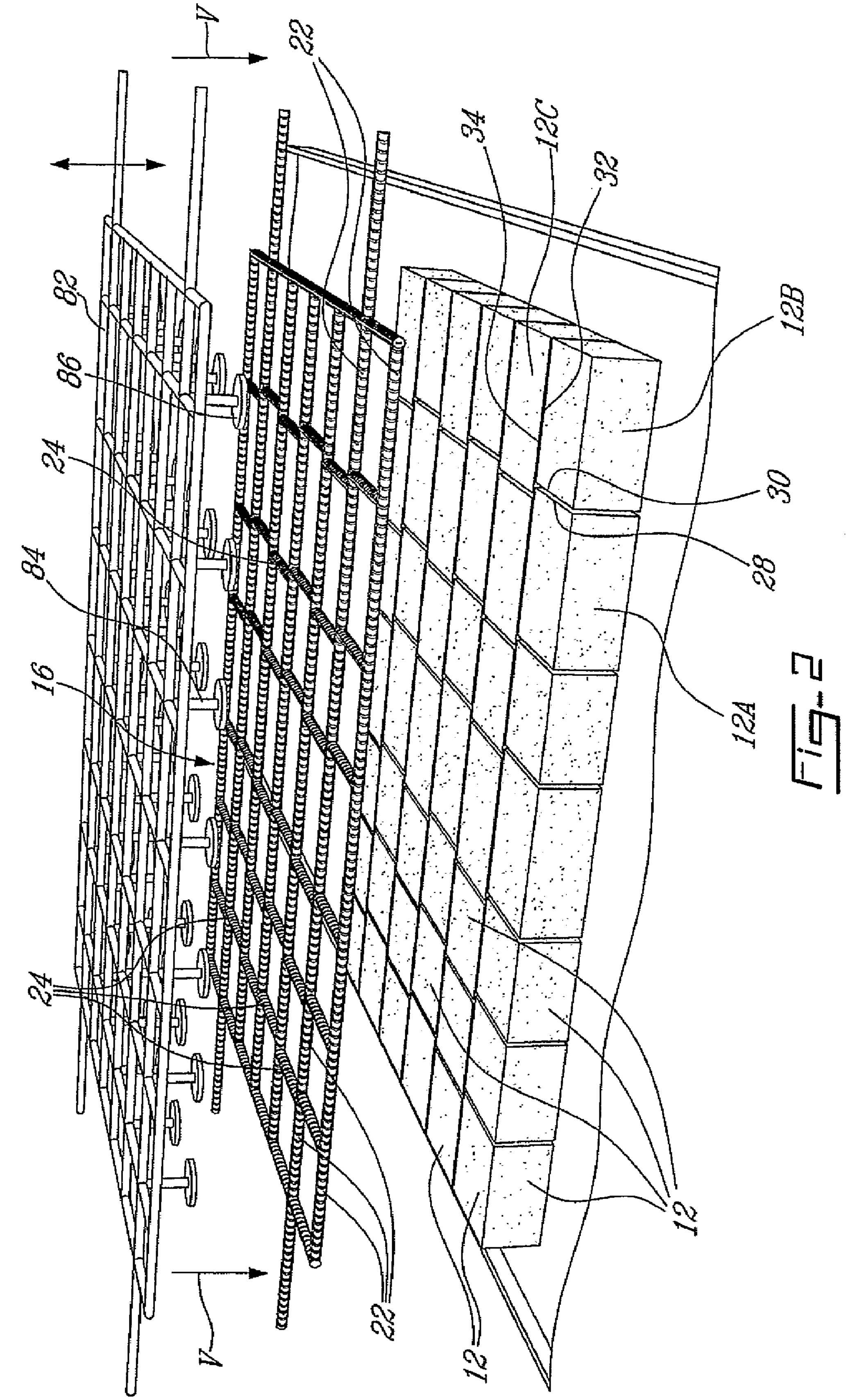
FIGS. 2 to 5 are perspective views of the operation of the pressure-applying device in accordance with an embodiment of the present invention as well as the support of the apparatus of FIG. 1.
Figure 3:
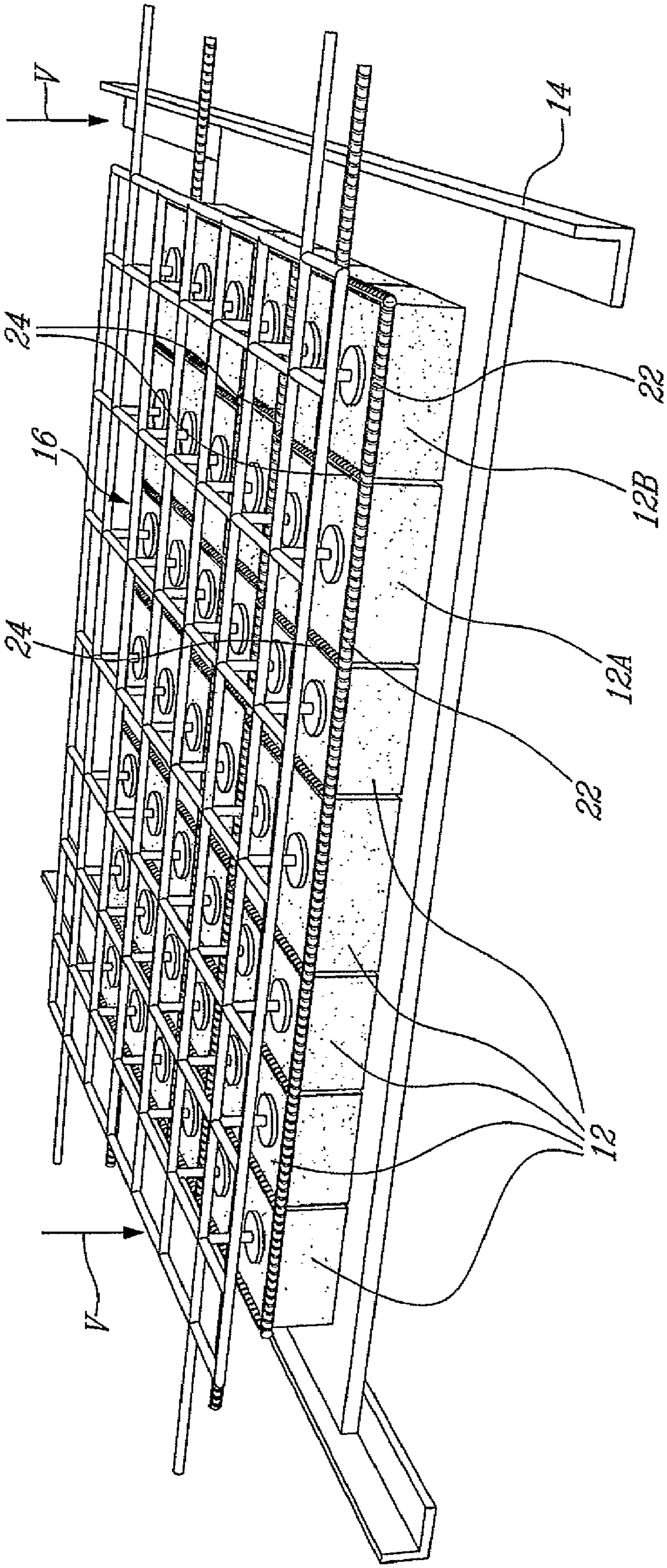
Figure 4:
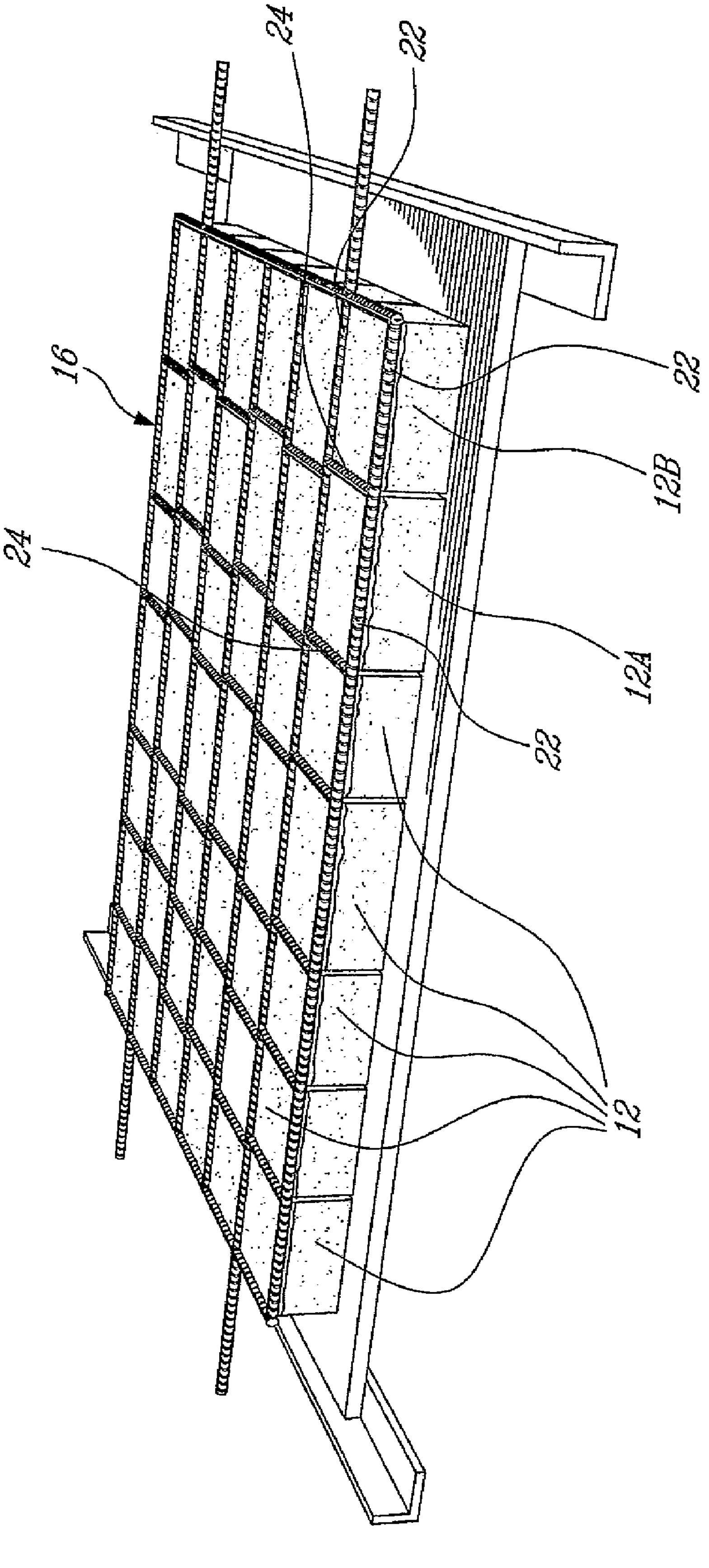
Figure 5:
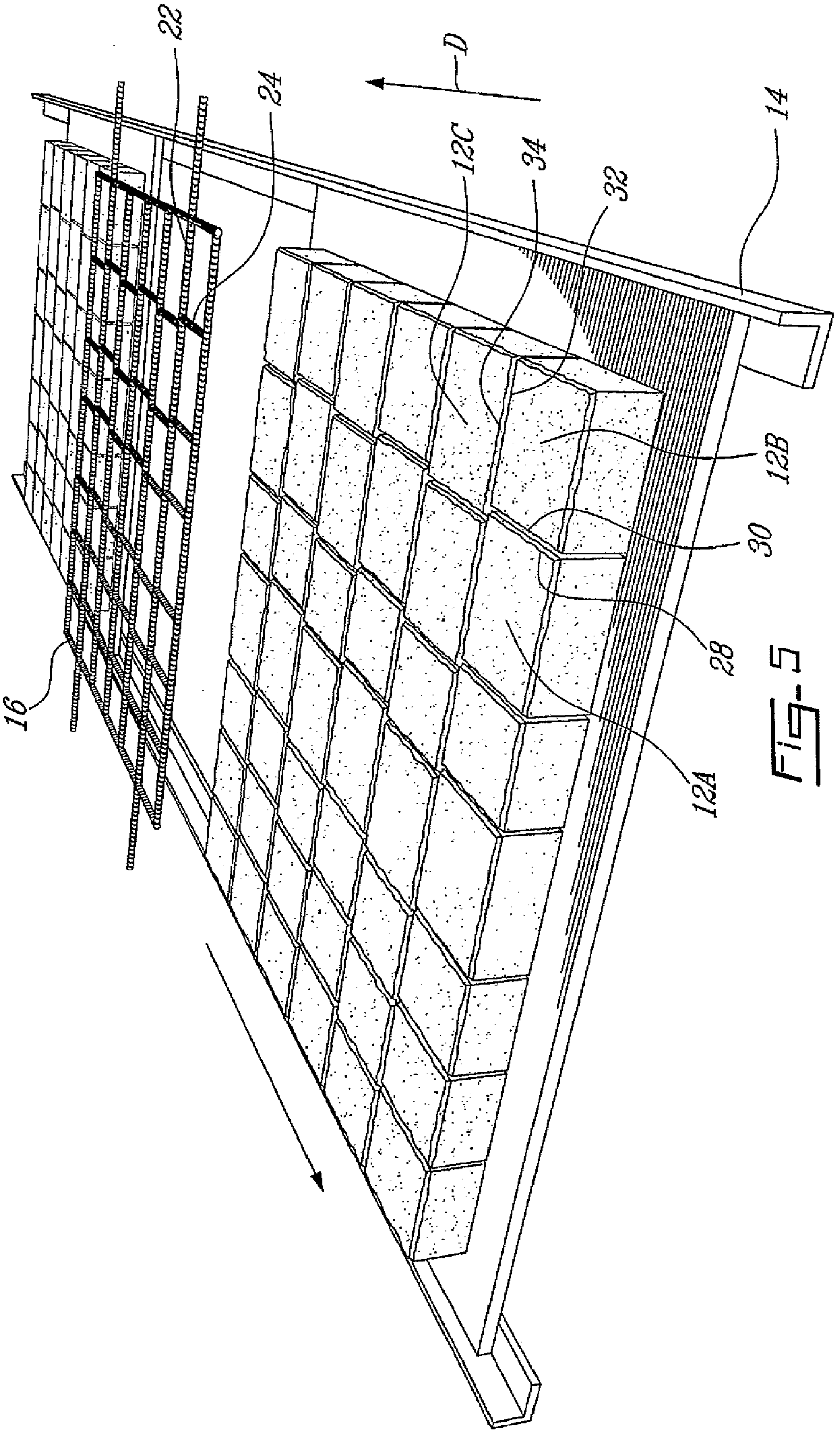
Figure 6:
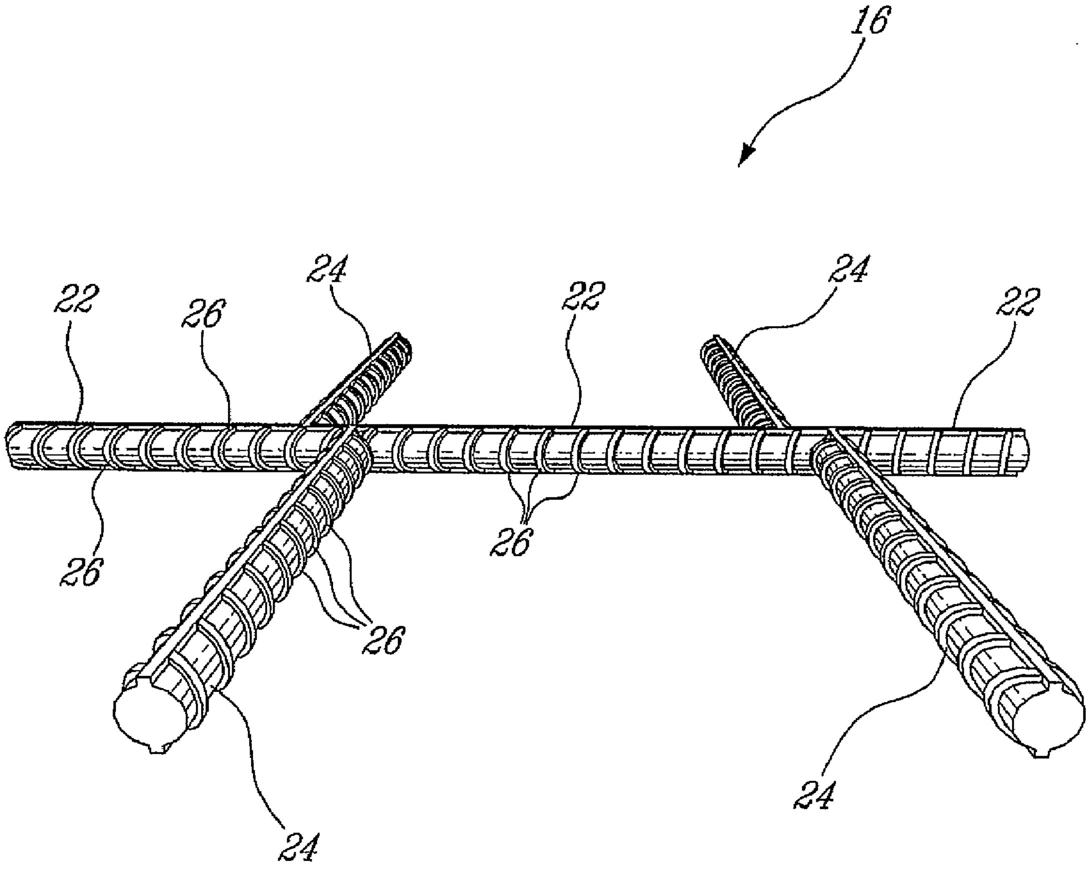
FIG. 6 is an enlarged perspective partial view of the pressure-applying device of FIG. 1

Apparatus 10 includes a pressure-applying device 16 positioned above support 14. The pressure-applying device 16 is movable between a block disengaging position as shown in FIGS. 1 and 2 and a block engaging position as shown in FIGS. 3 and 4. Returning to FIG. 1, the pressure-applying device 16 is mounted to actuators 18 and 20, which can be hydraulic motors, for movement between the block engaging and disengaging positions.

As shown in FIG. 2 to FIG. 6, the pressure applying device 16 includes lateral and longitudinal pressure applying members 22 and 24 respectively which are rod elements having ridges 26 thereon. A block stabilizing device 82 is also disclosed and is used in conjunction with the pressure applying device 16 to maintain the blocks 12 in place. The block-stabilizing device 82 is sized and designed to mate with the pressure applying device 16. Each contact pad 86 is disposed on the block-stabilizing device 82 to be aligned with a corresponding opening on the pressure-applying device 16 when the block-stabilizing device 82 is disposed above the pressure-applying device 16. A leg 84 connects the contact pad 86 to the block-stabilizing device 82 and provides sufficient space to move the pressure-applying device 16 between the blocks 12 and the block-stabilizing device 82 still contacting the blocks 12.

Illustratively, in operation, the block-stabilizing device 82, while the pressure applying device 16 is disposed between the block-stabilizing device 82 and the blocks 12, is moved in contact with the series of blocks 12. Each block 12 is thus maintained in place by the pressure from the pads 86. Then, the pressure applying device 16 is moved toward the series of blocks 12 in contact with the blocks 12 while the block-stabilizing device 82 still ensures the series of blocks do not move. The pressure applying device 16 imprints the blocks and is moved away from the blocks 12. Once the pressure applying device 16 is moved away from the series of blocks 12, the block-stabilizing device 82 is then moved away from the series of blocks 12.

As shown in FIG. 2 to FIG. 7, right after the blocks 12 are formed by pressing cementitious material in moulds as in known in the art, the blocks 12, which are still humid, will be pressed by the pressure applying device 16. The lateral member 22 will press two edges of two adjacent blocks and the longitudinal member 24 will press two edges of two adjacent blocks as well.

More specifically, element 24 engages top adjacent lateral edges 28 and 30 of two adjacent blocks 12A and 12B while element 22 engages the respective top back edge and top front edge 32 and 34 of two adjacent blocks 12B and 12C. As shown in FIG. 1, the device 16 engages blocks 12 on support 14 via the actuators 18 and 20, which move the pressure-applying device 16 in a up and down movement in a vertical direction as shown by arrows U and D respectively.

Figure 9:
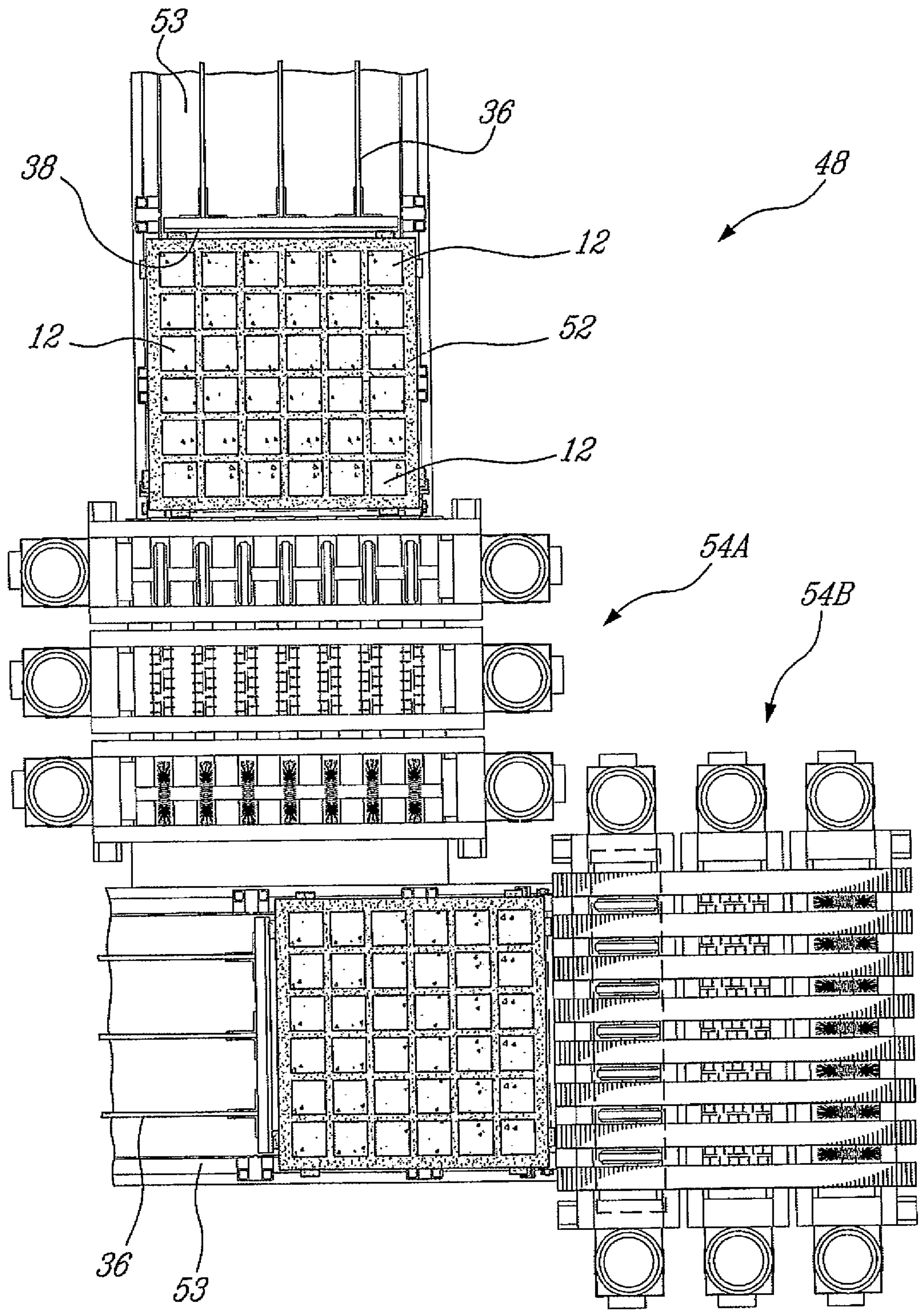
FIG. 9 is a top plan view of a block surface-texture modifying device in accordance with an embodiment of the invention.
Figure 10:
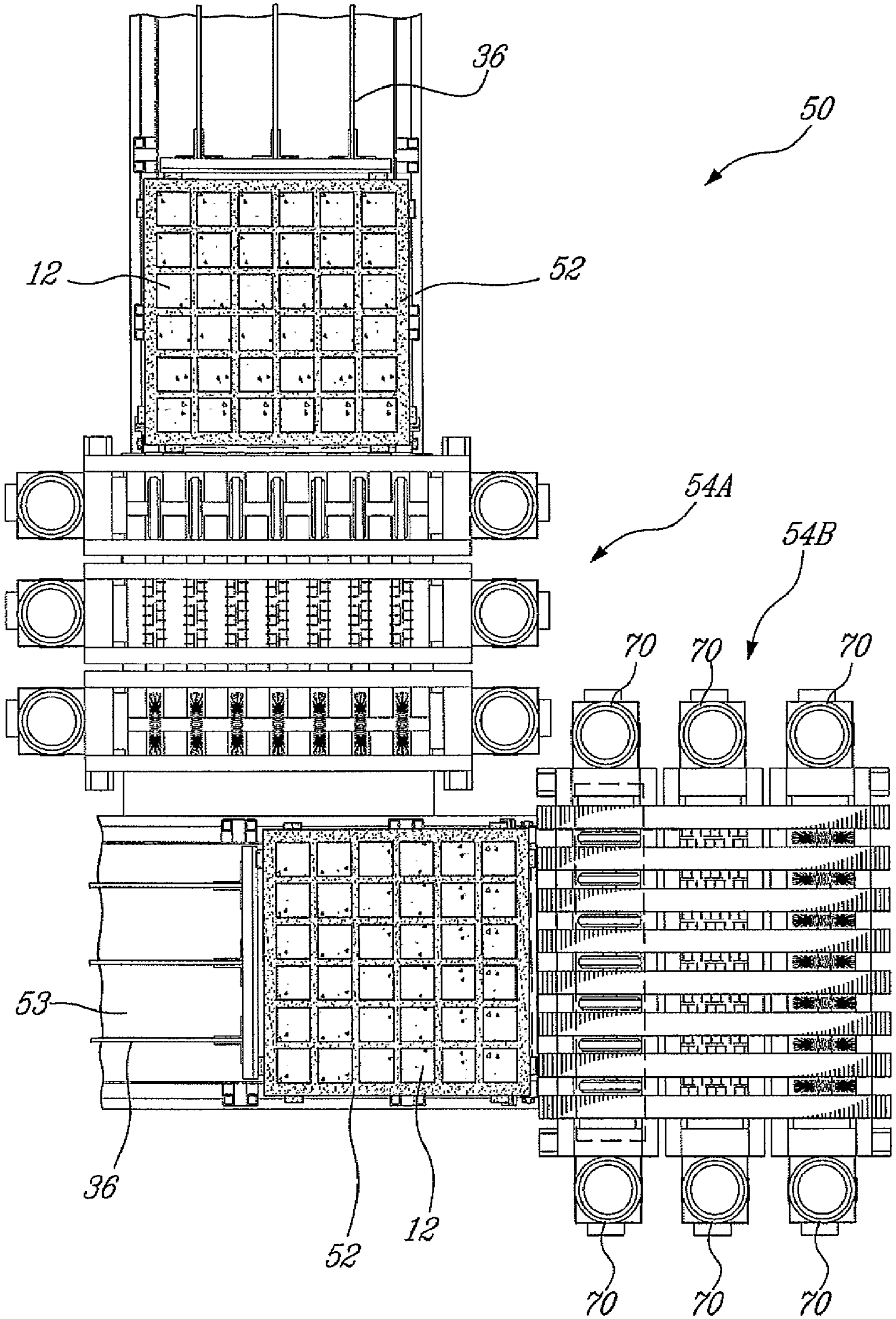
FIG. 10 is a top plan view of a block surface-texture modifying device in accordance with another embodiment of the invention.

Once blocks are molded from cementitious material, they can be moved under a pressure applying device 16 via a translational movement imparting device such as a support 14. Of course, other ways of moving blocks along a support such as shown in FIGS. 9 and 10 can be contemplated within the scope of the present invention. For example, in FIG. 9 and FIG. 10, there is shown a push member 36 having a block engaging member 38 and being powered by an actuator (not shown).

In another embodiment, that can be deducted from FIGS. 2 to 5, the pressure applying device 16 can be moved manually by workers in order to press on the surface texture of blocks 12, which are still humid, after the blocks 12 have been formed.

Figure 8:
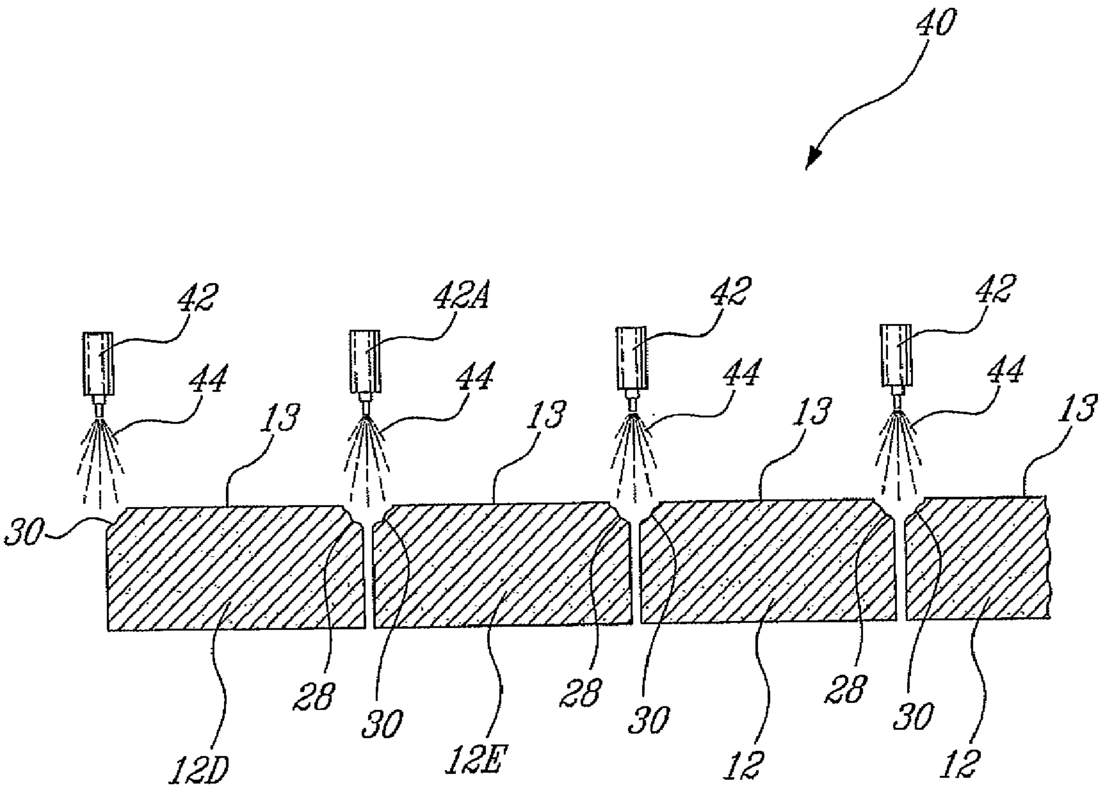
FIG. 8 is a schematic front view of the apparatus for modifying the surface texture of pre-cast building blocks in accordance with another embodiment of the present invention.

In another embodiment, shown in FIG. 8, the pressure-applying device 40 comprises air blowers 42. The air blowers 42 are actuated so as to engage and disengage blocks 12. Hence when the air blowers 42 are actuated to engage blocks 12 they engage these blocks via air pressure denoted by numerical reference 44. Specifically, the air blowers 42 blow air 44 onto the top surface 13 of blocks 12. As shown in FIG. 8, the air blowers 42 can be so positioned as to blow at the top edges 28 and 30, a blower 42A can be so positioned as to apply air pressure 44 onto the adjacent edges 28 and 30 of two adjacent blocks 12D and 12E.

Figure 7:
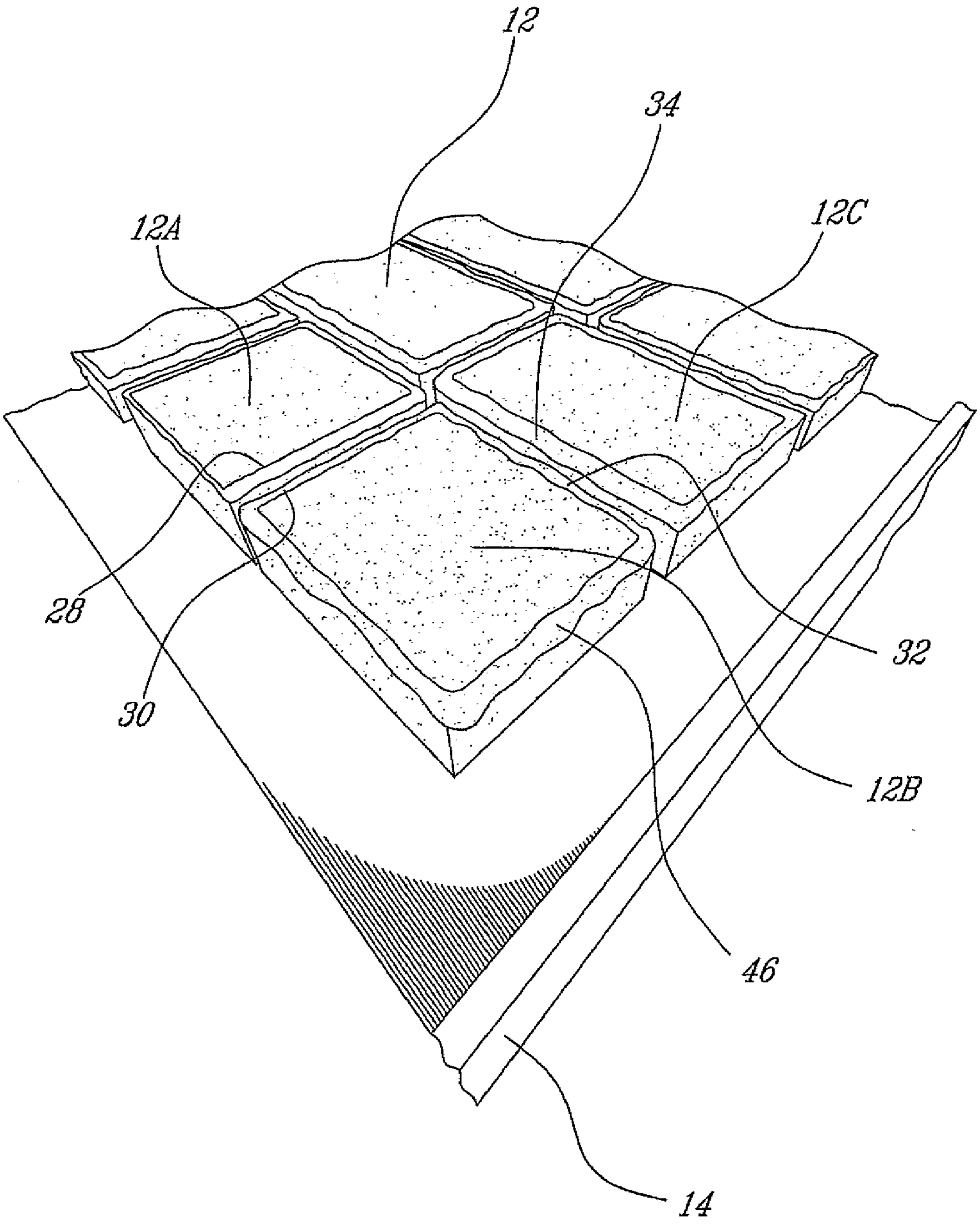
FIG. 7 is an enlarged perspective view of the blocks of FIG. 5 after having been treated by the apparatus of FIG. 1.

With particular reference to FIG. 7, the contoured edge 46 of freshly pressed blocks 12 has had its surface texture modified or made weak. The foregoing modification or imparted weakness, allows the blocks after complete curing to have those same contoured edges 46, or any other like treated surface texture, be easily broken and modified by surface texture modification apparatuses in order to artificially age these blocks.

With reference to FIGS. 9 and 10, there is shown block surface texture modification apparatuses 48 (see FIG. 9) and 50 (see FIG. 10). The apparatuses 48 and 50 are described in Canadian application No. 2,509,064 filed on Jun. 2, 2005 and in U.S. application Ser. No. 11/144,193 filed on Jun. 3, 2005, these documents are incorporated herein by reference. Generally the blocks are spaced by a spacer 52. It should be noted that the spacer 52 can also be used as a pressure-applying device as well. For example, when placing the spacer 52 onto the blocks 12 in order to space them apart, the spacer 52 will engage the top edges of still humid blocks 12, or any other surface thereof, similar to the way the pressure applying device 16 does, as shown in FIGS. 2 to 4.

The blocks 12 are moved along the support 53 by push members 36 in order to be engaged by block modification devices 54A, 54B This way, the block modification apparatuses described above can engage the modified or weakened contoured edge 46, or any other like treated surface after the blocks 12 have gone through curing and these pre-modified surfaces can be easily modified with less pressure or impact by surface-texture modifying devices since the pre-modified surfaces have been broken or deformed right after the blocks were molded by the pressure applying devices and methods disclosed above.

Figure 11:
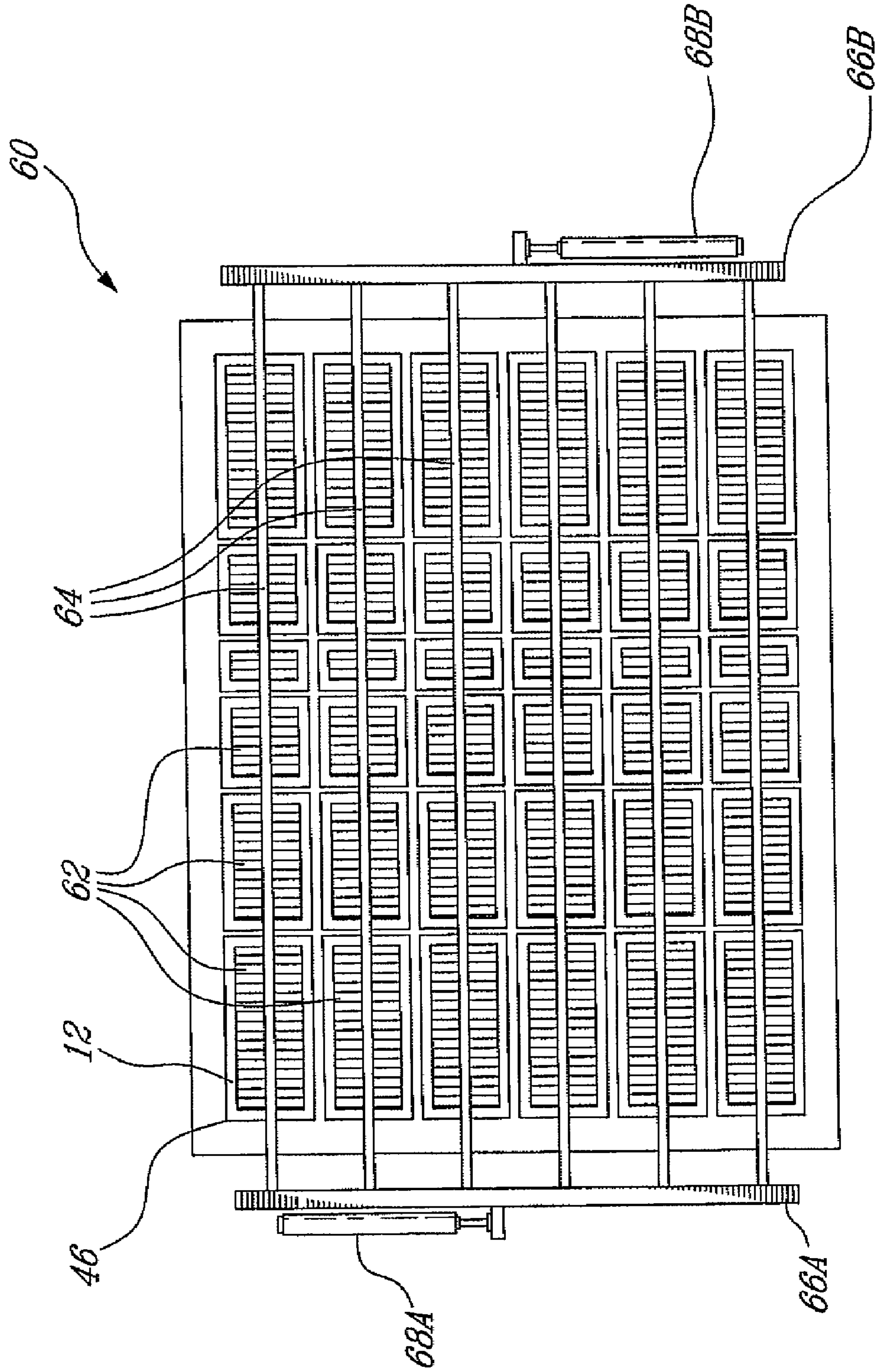
FIG. 11 is top plan view of a block stabilizing device in accordance with an embodiment of the invention.

With reference to FIG. 11, there is shown a block-stabilizing device 60. This block-stabilizing device 60 comprises a plurality of optional plaques 62 of varying sizes and shapes that are connected to each other by connecting member 64. Connecting members 64 are connected to supports 66A and 66B at each of their longitudinal ends. These supports 66A and 66B are mounted to actuators 68A and 68B respectively for vertical movement thereof between block disengaging and block engaging positions.

Plaques 62 are used to engage blocks 12 and apply pressure thereon. The plaques 62 cover most of the top surface of 13 of a block 12 yet expose its outer perimeter or contoured edge 46 thereby providing for a variety of block modification devices to engage this exposed contoured edge such that the various block modification devices can modify the texture surface of the exposed perimeter or contoured edge 46.

Still referring to FIG. 11, the block-stabilizing device 60 could be used without the plurality of plaques 62. The contact with the blocks 12 is directly made with the connecting members 64. The exposed surface of the block 12 is greater when no plaque 62 is used. The block modification devices 54 have access to the top surface to alter the texture.

The direction of the connecting members 64 is orthogonally disposed in respect with the axis of rotation of the block modification devices 54. The block modification devices 54 can perform the action on the series of blocks 12 using rotative tools without crossing the connecting members 64. Once the series of blocks 12 has been modified in a first direction the connecting member is removed and turned at a 90° angle. The block modification devices 54 can perform the action in the second direction, orthogonal to the first direction, to complete modifying the texture on each side of the blocks 12.

Figure 12:
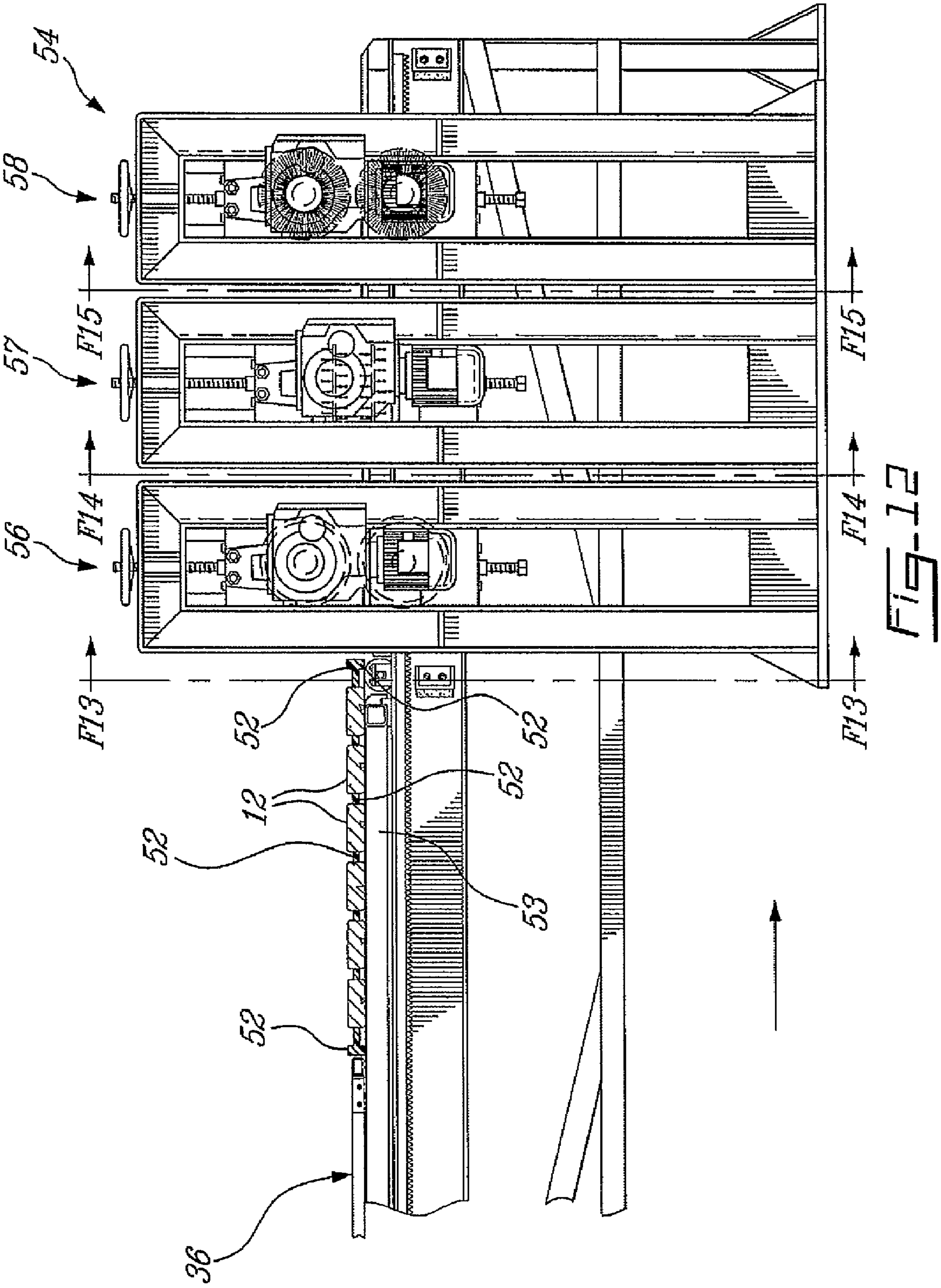
FIG. 12 is a side elevation view of a block modification device of FIG. 10.

FIGS. 9, 10 and 12 show a multi-station block texture modifying apparatus 54. This apparatus 54 includes a support 53 for supporting a plurality of blocks 12 thereon. In this embodiment, there are two multi-station block texture modifiers 54A and 54B. In other embodiments, apparatus 54 may include one or more multi-station block texture modifier. In this embodiment, each multi-station block texture modifier 54 respectively includes a pressure-applying station 56, an impacting station 57, and a polishing station 58. In this embodiment, stations 56, 57 and 58 are in an upstream arrangement.

In accordance with this embodiment, the multi-station block texture modifier 54 may include only a pressure-applying station 56 and an impacting station 57. Furthermore, in another embodiment, the impacting station 57 can be upstream of the pressure-applying station 56.

The multi-station block texture modifying apparatus 54 also includes a translational displacer (push member 36) for imparting translational displacement between blocks 12 on the support 53 and the multi-station block texture modifier 54.

Figure 13:
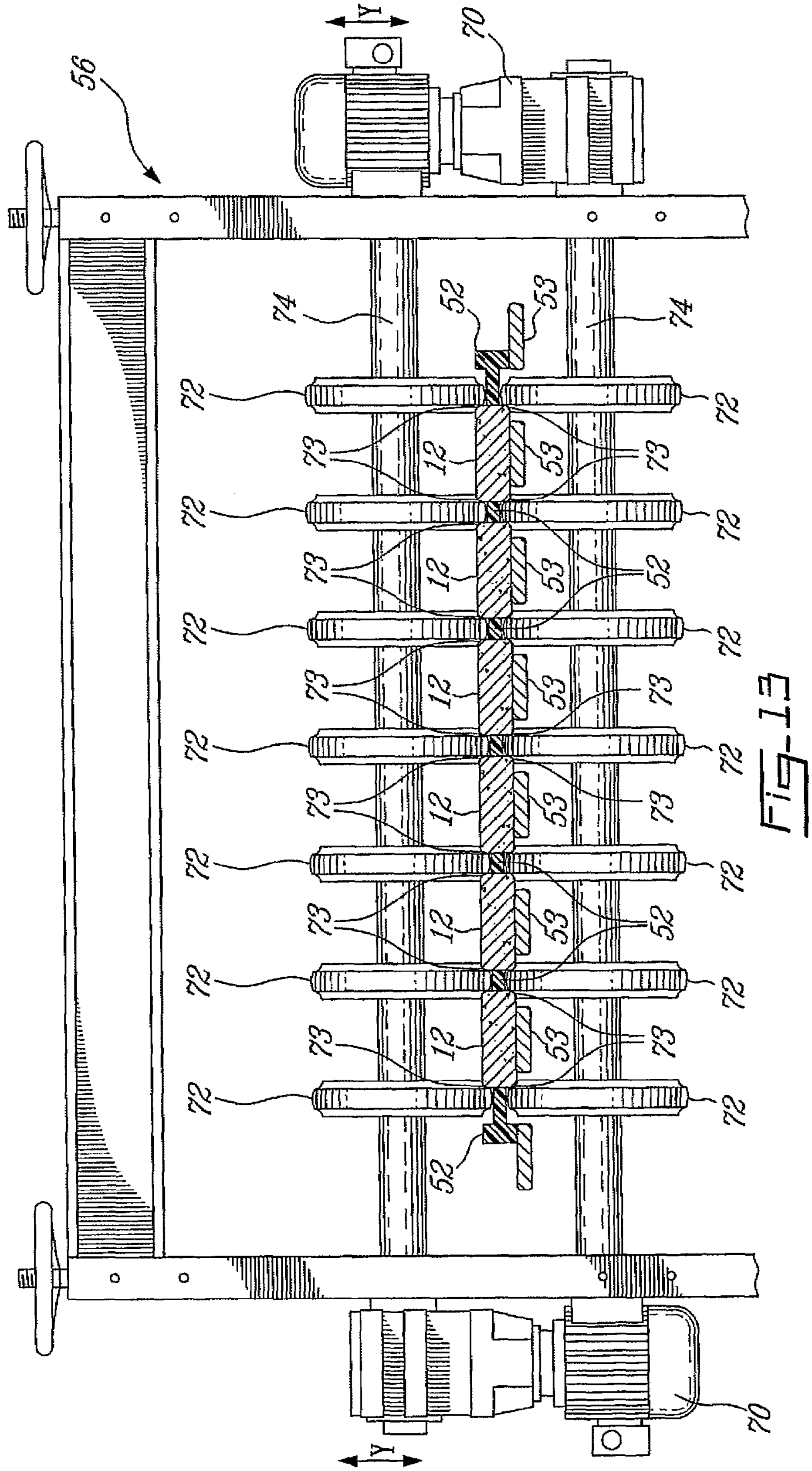
FIG. 13 is a front elevation view of a portion of the block modification device of FIG. 12.
Figure 14:
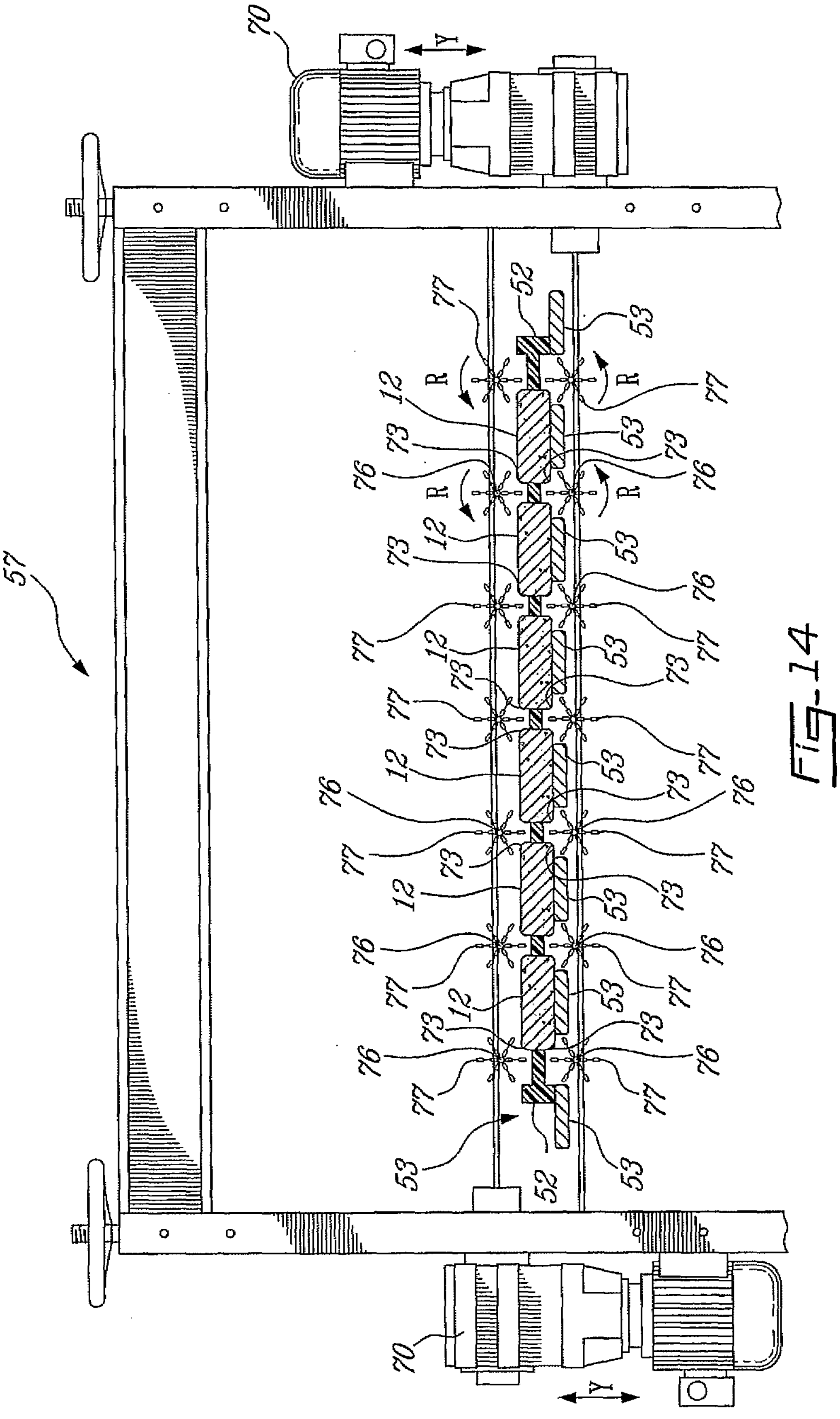
FIG. 14 is a front elevation view of a portion of the block modification device of FIG. 12.
Figure 15:
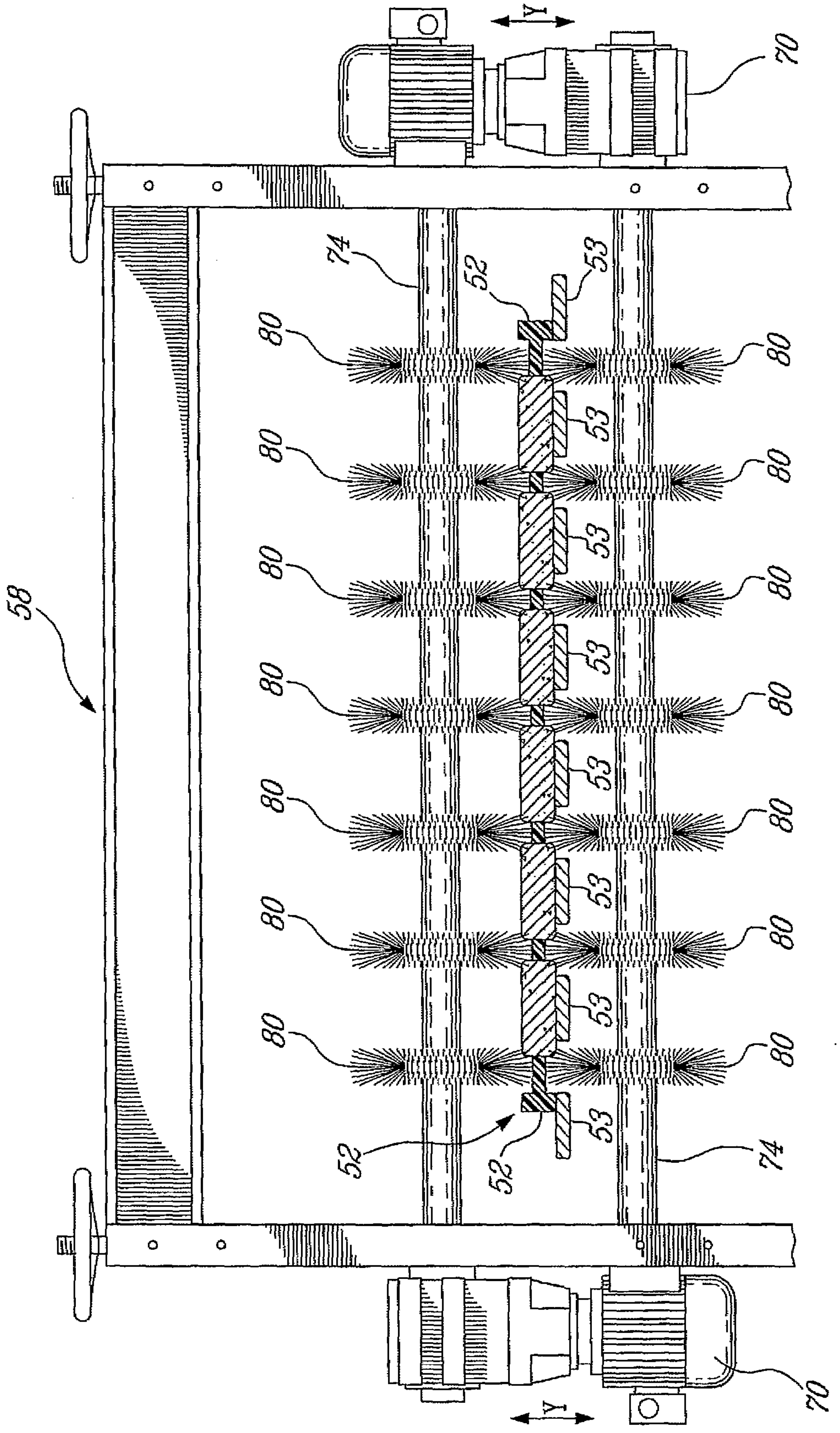
FIG. 15 is a front elevation view of a portion of the block modification device of FIG. 12.

In this embodiment, the support 53 is a table that provides for the plurality of blocks 12 to be moved thereon through the multi-station block texture modifier 54. As shown in FIGS. 13, 14 and 15 support 53 includes longitudinal separate panels that are so spaced apart as to expose the bottom edges of blocks 12 as will be further explained below.

The translational displacer 36 is a push member. The push member 36 has one end (not shown) mounted to an actuator (not shown) for translational movement thereof, and a free block engaging end for pushing the engaging blocks 12 or a plurality of blocks 12 on the support and through the multi-station block texture modifier 54.

In another embodiment, the translational displacer can comprise a conveyor as is understood by the skilled artisan to displace blocks 12 relative to the modifier 54. Still in a further embodiment, the translational displacer can comprise a wide variety of actuation assemblies for displacing the modifier 54 relative to immobile blocks 12. In this embodiment, the modifier 54 can be displaced as a unit or its stations 56, 57 and 58 can be displaced separately. Furthermore, combinations of push members 36, conveyors and actuators to displace modifier 54 and/or its stations 56, 57 and 58 can also be contemplated within the scope of the present invention.

As shown in FIGS. 12 through 16, the blocks 12 are spaced apart by a spacer 52. As more clearly shown in FIG. 9, this spacer 52 is a rectangular-shaped grid and comprising spacing members in the form horizontal cross lateral members and longitudinal members thereby creating receiving areas for receiving blocks 12 therethrough. Longitudinal spacer members extend between opposite enclosure members, whereas longitudinal spacer members extend between opposite enclosure members for a plurality of blocks 12 to be moved together on the support 53. Furthermore, the grid spacer 52 provides for the blocks 12 to be spaced from each other at a predetermined constant distance. As better shown in FIG. 16, and as will be explained later, the top edges and bottom edges 73 of two adjacent blocks 12 are kept apart at a predetermined constant distance allowing for the multi-station block texture modifier 54 to modify edges 73, as will be explained herein.

As better shown in FIG. 12, and as aforementioned, the multi-station block texture modifier 54 includes a pressure-applying station 56, an impacting station 57, and a polishing station 58.

Turning to FIG. 13, there is shown the pressure-applying station 56, which serves to apply a sustained pressure to blocks 12 that are engaged thereby. The pressure-applying station 56 includes pressure-applying elements 72, which engage the blocks 12 in order to apply a sustained pressure to the texture surface of the blocks 12 so that this texture surface is modified.

In the embodiment shown here, the pressure-applying elements 72 are top rollers mounted along a top rotating longitudinal member 74, the pressure-applying elements 72 are bottom rollers mounted along bottom longitudinal member 72, and so positioned as to respectively engage the top and bottom opposite edges 73 of blocks 12. As shown, a single given roller 72 of the top member 74 engages two opposite edges 73 of two adjacent blocks 12 and a single given roller 72 of the bottom member 74 engages two opposite edges 73 of two adjacent blocks 12. In this illustrative example the top and bottom rollers are collinear. The top and bottom longitudinal members 74 are actuated by motors 70 to change their relative distance.

As aforementioned, the support surface 53 also includes separate vertical members 53, which are so spaced apart as to expose the bottom edges 73 of block 12, so they can be engaged by the multi-station block texture modifier 54.

The top moveable member 74 or bottom member 74 can be moveable in an upward or downward fashion, as shown by arrow Y in order to modulate the pressure applied by a roller 72 mounted thereon. In another embodiment, the rollers 72 may be expandable, again in order to modulate the sustained pressure applied to the texture surface of the blocks 12. The foregoing features are described in PCT publication WO/2004078441, which is incorporated herein by reference.

In an embodiment, the pressure-applying station 56 may comprise only top pressure applying elements 72. In another embodiment, the pressure-applying station 56 may comprise only bottom pressure applying elements 56.

Turning now to FIG. 14, there is shown an impacting station 57, which includes top and bottom impacting elements 77. In this example, these impacting elements 76 are chains extending from a rotating member in the form of a rod 76 that is mounted to an actuator in order to rotate about its longitudinal length, hence, actuating the chains 77 so that they spin in the clockwise direction shown by arrow R, of course the chains 77 can also be spun in a counter-clockwise direction, in order to impact the texture surface of blocks 12. In this example, it is the top and bottom edges 73 of the blocks 12 which are respectively impacted by the chains 77. A shown, a given top impacting element 77 is so position as to simultaneously impact the adjacent top edges 73 of two adjacent blocks 12 and a given bottom impacting element 77 is so position as to simultaneously impact the adjacent bottom edges 73 of two adjacent blocks 12. In this example the top and bottom-impacting element 76 are collinear. In an embodiment, the impacting station 57 may comprise only top impacting elements 76, in another embodiment the impacting station 57 may comprise only bottom impacting elements 76. Of course impacting elements 76 can comprise any type of protrusion member for impacting the surface texture of blocks 12 as will be understood by the skilled artisan. A variety of such impacting elements are described in PCT publication WO/2004078441.

Turning now to FIG. 14, there is shown an impacting station 57, which includes top and bottom impacting elements 77. In this example, these impacting elements 76 are chains extending from a rotating member in the form of a rod 76 that is mounted to an actuator in order to rotate about its longitudinal length, hence, actuating the chains 77 so that they spin in the clockwise direction shown by arrow R. Of course, the chains 77 can also be spun in a counter-clockwise direction, in order to impact the texture surface of blocks 12. In this example, it is the top and bottom edges 73 of the blocks 12 which are respectively impacted by the chains 77. A shown, a given top impacting element 77 is so positioned as to simultaneously impact the adjacent top edges 73 of two adjacent blocks 12 and a given bottom impacting element 77 is so positioned as to simultaneously impact the adjacent bottom edges 73 of two adjacent blocks 12. In this example, the top and bottom-impacting elements 76 are collinear. In an embodiment, the impacting station 57 may comprise only top impacting elements 76, in another embodiment the impacting station 57 may comprise only bottom impacting elements 76. Of course, impacting elements 76 can comprise any type of protrusion member for impacting the surface texture of blocks 12 as will be understood by the skilled artisan. A variety of such impacting elements are described in PCT publication WO/2004078441.

With respect to FIG. 15, there is shown the polishing station 58, which includes top and bottom polishing members 80. These top and bottom polishing members 80 are respectively mounted along a top and bottom rotating members 74. Rotating longitudinal members 74 are operatively mounted to motors 70 so as to be actuated to rotate about their respective longitudinal axes. In this way, the top polishing member 80 will rotate along the axis formed by member 74 and the bottom polishing member 80 will rotate along the axis formed by member 74. In this example, the polishing members 80 are in the form of brushes. The brushes 80 are so spaced along their respective top or bottom members 74 so as to respectively engage the top edges 73 and bottom edges 73 of blocks 12. As shown, a single given top brush 80 engages two edges 73 of two adjacent blocks 12 and a single given bottom brush 80 engages two edges 73 of two adjacent blocks 12. In an embodiment, the polishing station 58 may comprise only top polishing elements 80 or only bottom polishing elements. Of course, a variety of polishing or brushing elements as is understood by a skilled artisan can be used.

Figure 16:
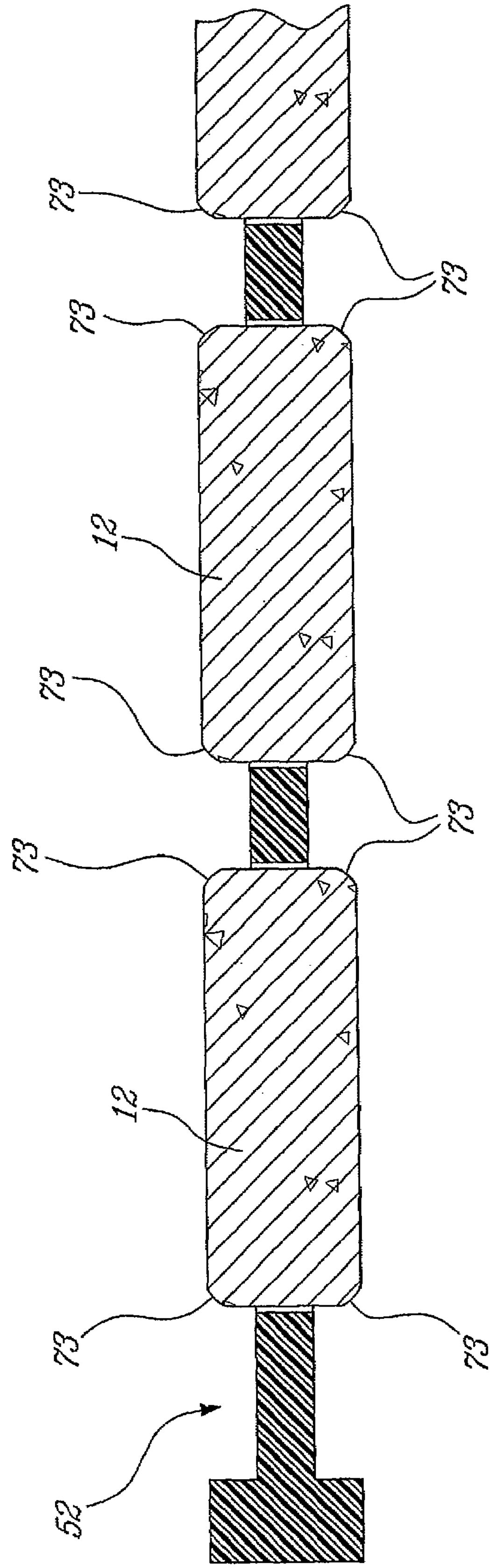
FIG. 16 is a section view of a series of blocks spaced apart by a spacer.

With respect to FIG. 16, it should be noted that the spacer 52 provided for spacing the blocks 12 at a predetermined and constant distances, the blocks 12 are laterally displaced relative to each other and this distance is provided by the width or thickness of members 52. In this way the modifier 18 has easier access to the edges 73.

Figure 17:
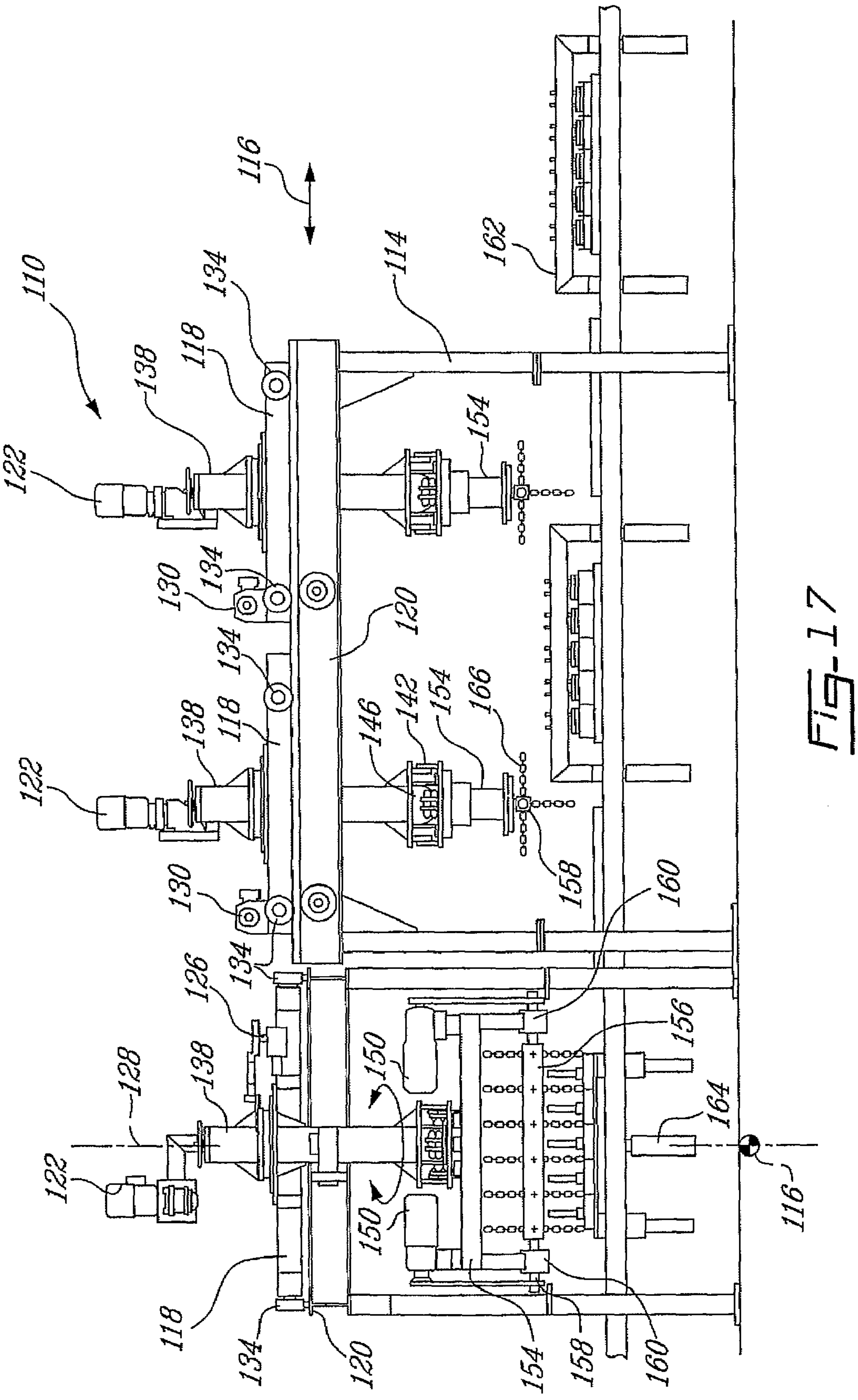
FIG. 17 is a combined side and front elevational views of another embodiment of the invention.
Figure 18A:
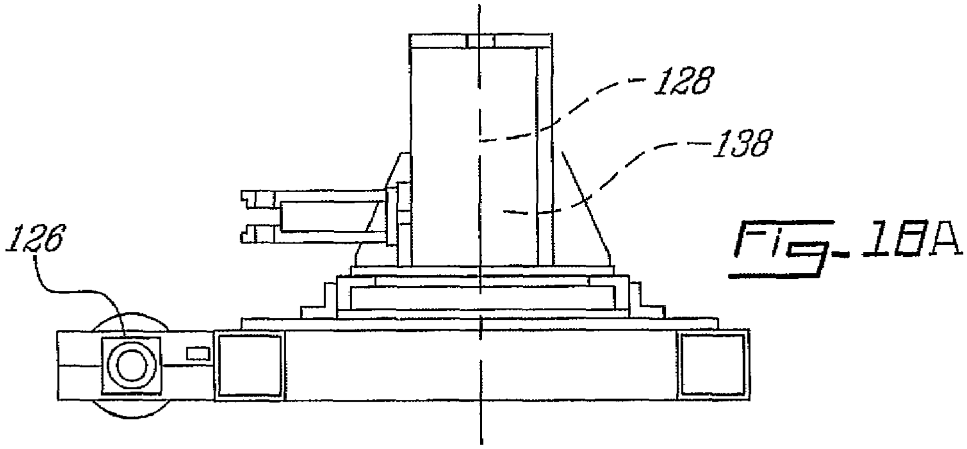
FIG. 18 includes a side elevational view and a top plan view of a portion in addition of various parts of the embodiment depicted on FIG. 17.
Figure 18B:
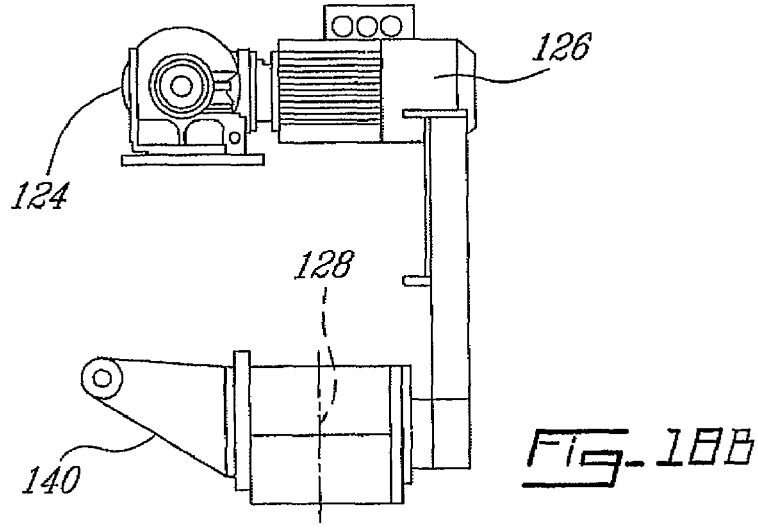
Figure 18C:
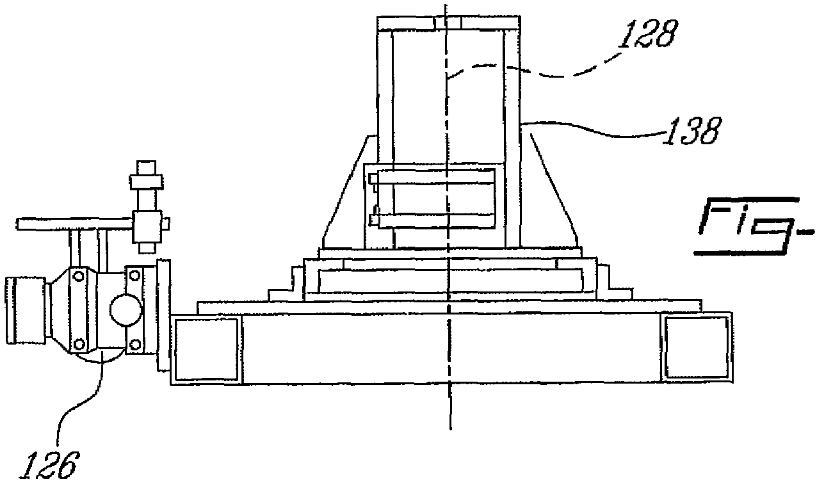
Figure 18D:
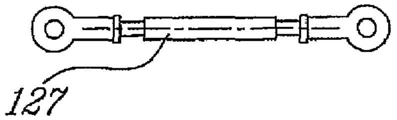

Referring now to FIG. 17 depicting an additional embodiment, the apparatus for modifying the texture of pre-casted blocks 110 includes a primary frame 114 and other elements supported by the primary frame 114. Steel members are used to build the primary frame 114 and are adapted for supporting a secondary frame 118 moveable along a longitudinal axis 116. The top portion of the primary frame 118 is designed such that the rail members 120 offer proper support for the wheels 134 of the secondary frame 118. The secondary frame 118 supports a tool holder 138 that is adapted for receiving a tool frame 154 on its lower portion. Longitudinal movements of the secondary frame 118 move the tool holder 138 and the tool frame 154 connected thereto. The tool holder 138 defines a tool holder axis 128 and is adapted retract or extend to change the position of the tool frame 154. Additionally, rotational (360.degree. and more) or pivotal (less than 360.degree.) movements of the tool holder 138 about the tool holder axis 128 changes the angle of the tool frame 154. A pivot, preferably disposed between the tool holder 138 and the tool frame 154, could allow pivotal or rotational movements of the tool frame 154 about the tool holder axis 128 thus avoiding the tool holder 138 to rotate or pivot about the tool holder axis 128. All rotation or pivotal movements of the tool frame 154 and the tool axis 158 about the tool holder axis 128 or the longitudinal axis 116 are considered within the realm of the present application.

The movements of the apparatus of FIGS. 17-24 are illustratively assisted by electric motors. A first motor 130, affixed to the secondary frame 118, moves longitudinally on the secondary frame 118. A second motor 126, also affixed to the secondary frame 118, provides a rotational or a pivotal movement to the tool holder 138. A third motor 122, connected on top of the tool holder 138, changes the length of the tool holder 138. Each motor 130, 126, 122 has variable speed and is operatively coupled to its respective associated elements using either a gearbox, a chain and sprocket mechanism, a lever or a pulley and belt connection. Other means for moving portions of the apparatus that are known in the art of designing industrial and manufacturing machines, such as hydraulic cylinders or linear positioning servo motors, are within the scope of the present application.

Each motor 130, 126, 122 is electronically managed by a computer or other programmable means for obtaining the desired wearing effect on the blocks 12. The combined movements of the apparatus' moveable members are coordinated by the computer to get a weathered, or aged, look on the pre-casted blocks 12. The linear movements, the height, the angle and the rotational speed of the wearing tool 166 are combined and vary according to an algorithm. The algorithm is interpreted by the computer and may be modified to change the desired aged-look of the pre-casted blocks. Slight continuous modifications to the tool axis 158 angle about the tool holder axis 128 while moving the secondary frame 118 along the longitudinal axis 116 with a spinning wearing tool 166 contacting the blocks 12 procure a random aged-look to the blocks 12.

The lower portion of the tool holder 138 discussed above is adapted for receiving a tool frame 154. The connection between the tool holder 138 and the tool frame 154 uses an arrangement of pivots 142 and damper 146. This arrangement of pivots 142 and damper 146 reduces the amount of vibrations generated by the wearing tool 166, supported by the tool frame, that is connected to the tool holder 138. The lower portion of the tool holder 138 is designed for easily changing the tool 166 in favor of various other tools (not shown) including, but not limited to, chipper, blades, brushes, rollers and hammers. Chipper and hammer tools can be used to completely cut a block 12 in smaller blocks.

An illustrative tool 166 is shown on FIGS. 17 and 23. The tool 166 mounted on the tool frame 154 comprises a central portion 156 defining a tool axis 158. The illustrative tool 166 is rotatably connected on each side to tool frame 154 with bearings or bushings 160. A pair of additional electric motors 150 is affixed to the tool frame, on each side of the tool frame 154, and operatively connected to the central portion 156 via sprockets 152. A series of wearing means, illustratively chains 166, are fastened 168 to the central portion 156. The central portion's 156 rotation induces movement to the chains 166 used to repetitively hit the blocks thus changing the texture of the blocks. The distance between the chains 166 is adjustable by moving the fastening means 168 along the central portion 156. A key 172 ensures the fastening means 168 do not rotate with the central portion 156. Other means for positioning the fastening means appearing obvious to the skilled reader are encompassed by the present application.

The blocks are disposed on a block support 162 under the primary frame 114. The block support 162 is of sufficient size to accommodate a series of blocks. The height of the block support 162 can be adjusted with the actuator 164. Each block is maintained on the block support 162 by a block-stabilizing device for stabilizing blocks during surface-texture modification operations. The block-stabilizing device comprises a plurality of linear stabilizing members. Each linear stabilizing member illustratively contacts the center of the top portion of a row of blocks leaving uncovered each lateral side portion of the blocks. The pressure exercised by the linear stabilizing member is sufficient to prevent any movement of the blocks during the surface-texture modification operations.

The linear stabilizing members disposed in the longitudinal direction 116, when the tool axis 158 is perpendicular to the longitudinal axis 116, allow the rotatable tool 166 to hit the blocks without hitting the stabilizing members. When the third electric motor 122 is activated to change the angle of the tool holder of illustratively about 90°, tool axis 158 is moved parallel to the orientation of the linear stabilizing members. A lift system changes the orientation of the linear stabilizing members (of about 90° angle in the present situation) to position the tool axis 158 normal to the orientation of the linear stabilizing members and avoid any contact between the wearing tool 166 and the linear stabilizing members.

Referring to FIG. 18, the second motor 126 connected to the secondary frame 118 uses a gear reduction mechanism 124 to connect the tool holder 138. A link 127 having a ball joint on each side connects the gear reduction mechanism 124 to a lever 140 disposed on the tool holder 138.

Figure 19C:
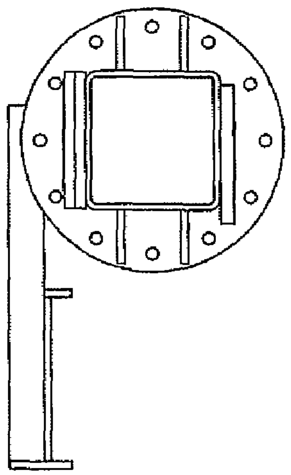
FIG. 19 includes side elevational views and a top plan view of a portion of the embodiment depicted on FIG. 17.
Figure 19B:
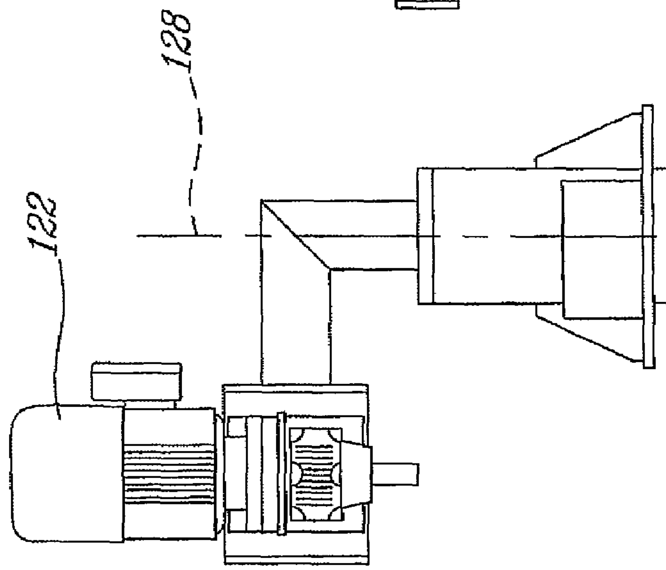
Figure 19A:
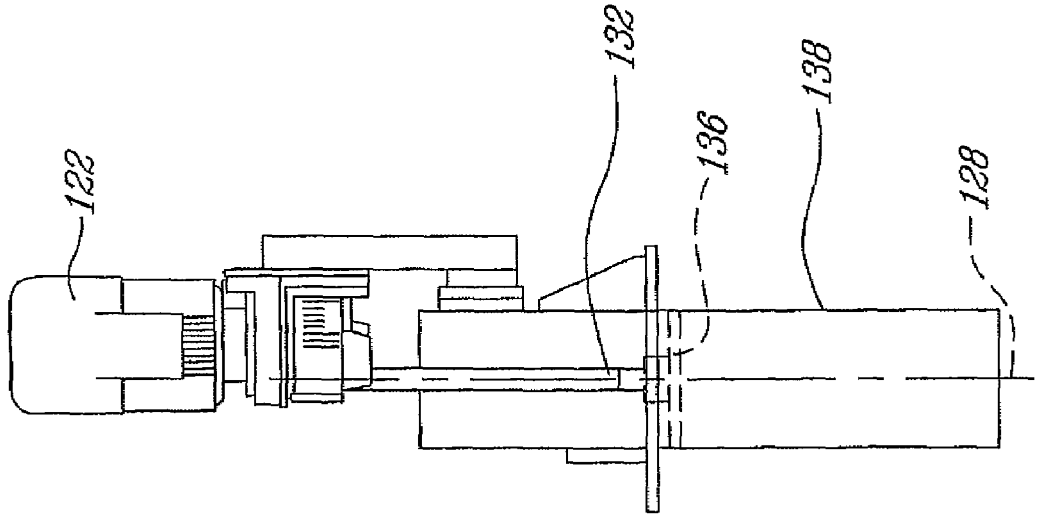
Figure 20B:
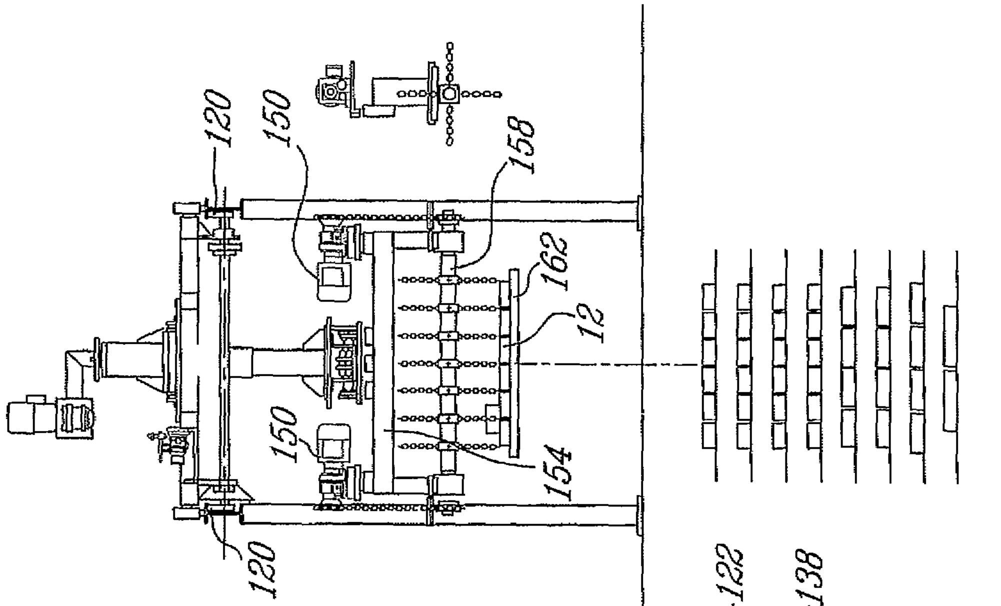
FIG. 20 is a combined side and front elevational views and top plan view of the embodiment depicted on FIG. 17
Figure 20A:
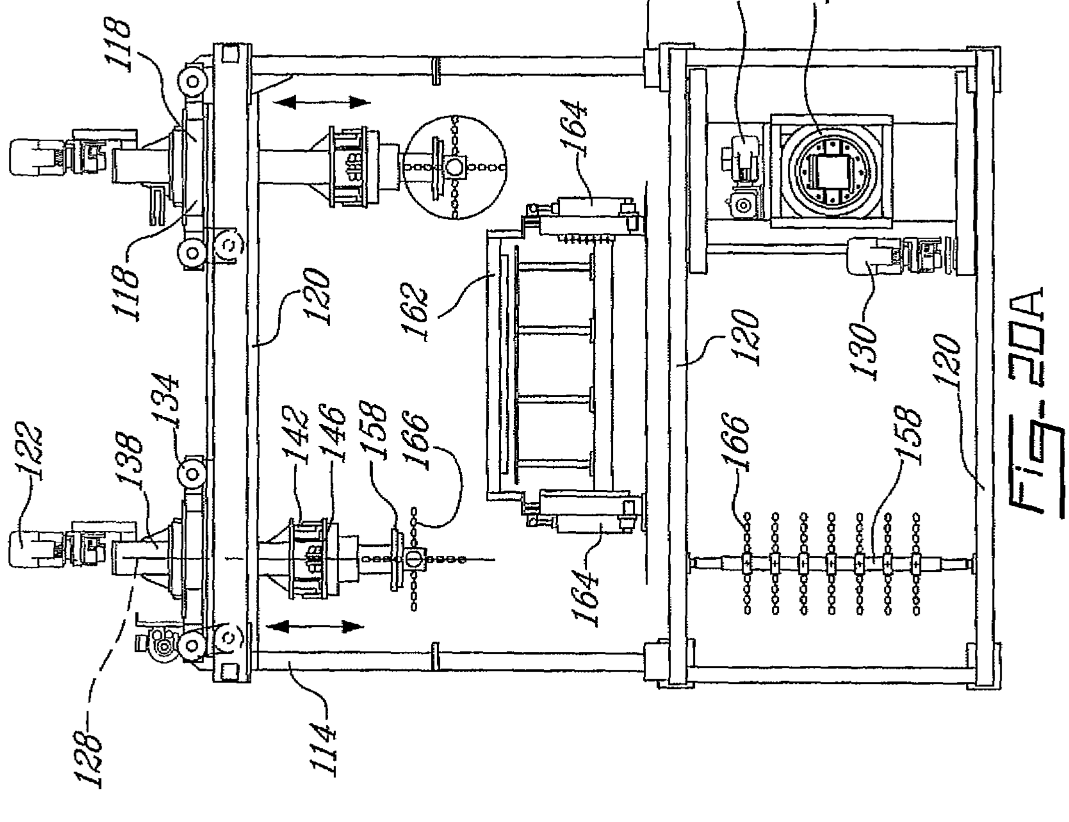
Figure 21A:
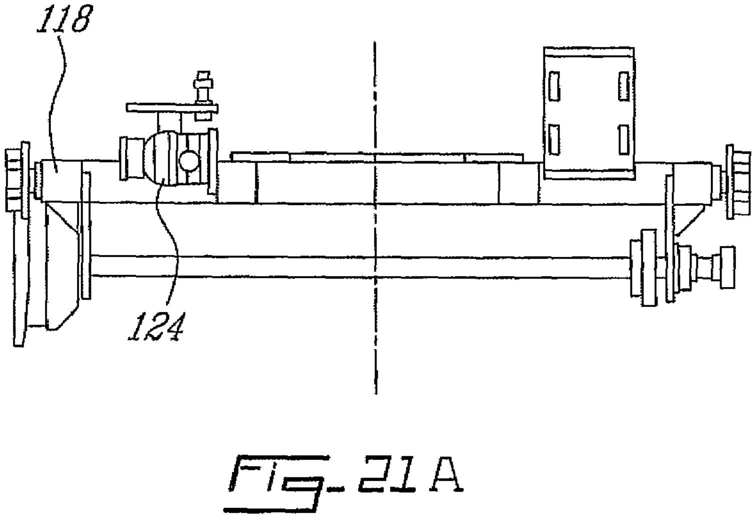
FIG. 21 is a combined side and front elevational views of a portion of the embodiment depicted on FIG. 17
Figure 21B:
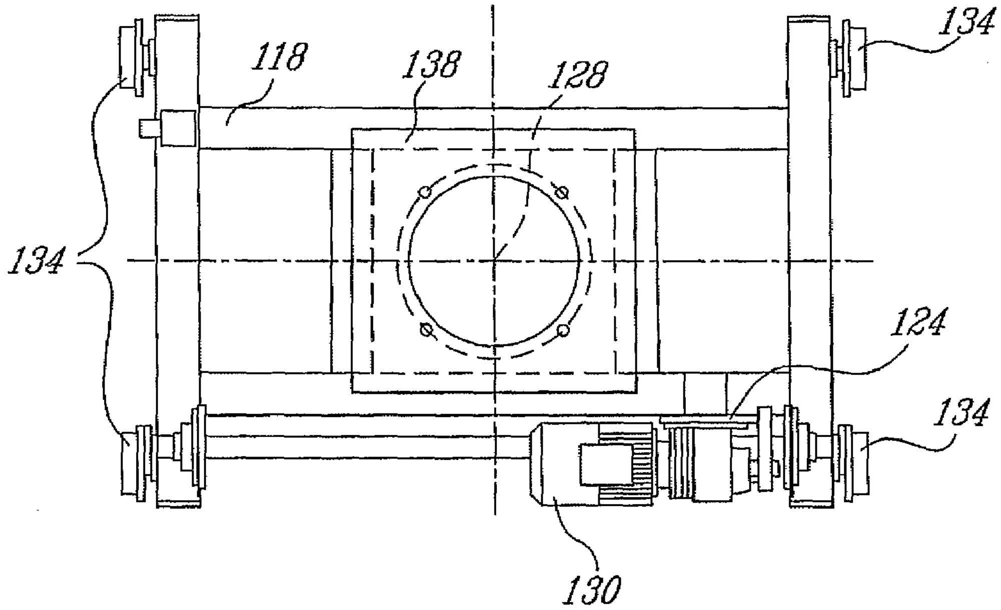
Figure 21C:
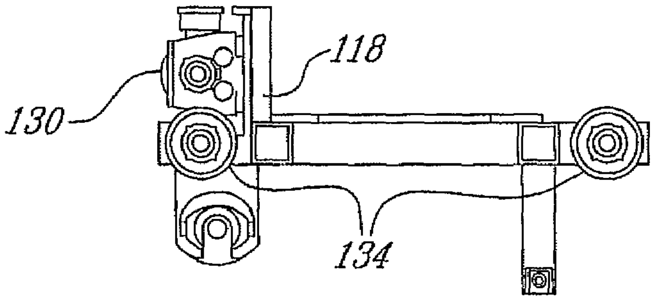
Figure 22A:
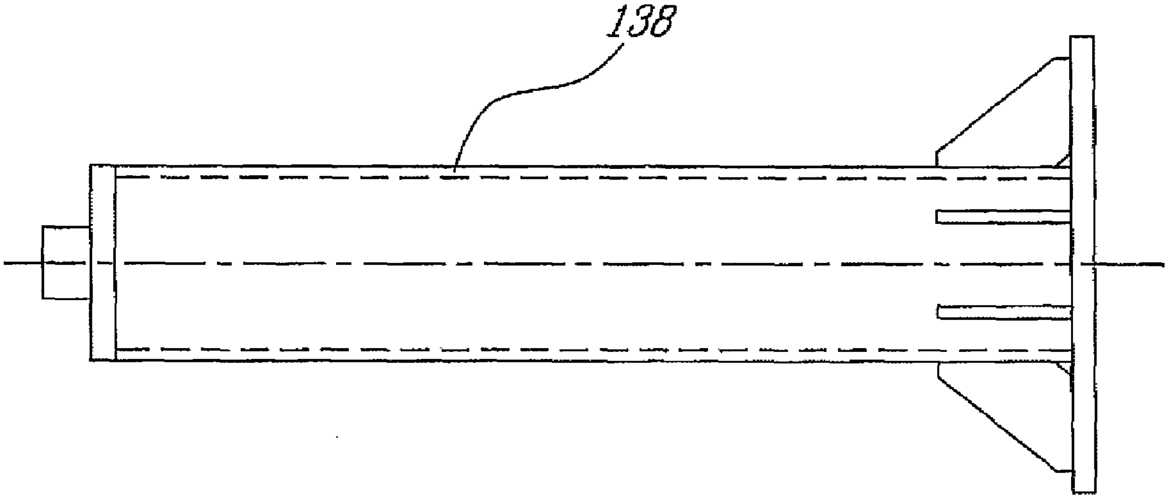
FIG. 22 is a combined side elevational view and top plan view of a portion of the embodiment depicted on FIG. 17
Figure 22B:
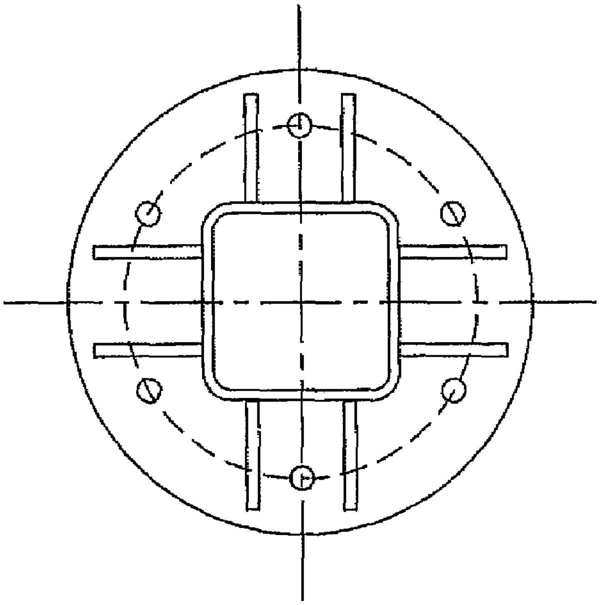
Figure 23B:
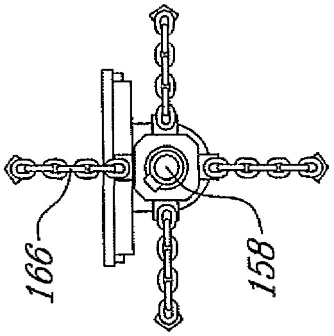
FIG. 23 is a combined side and front elevational views of a portion of the embodiment depicted on FIG. 17
Figure 23F:
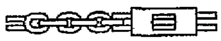
Figure 23E:
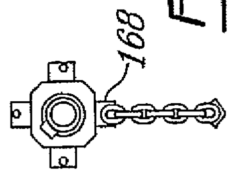
Figure 23D:
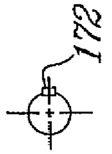
Figure 23A:
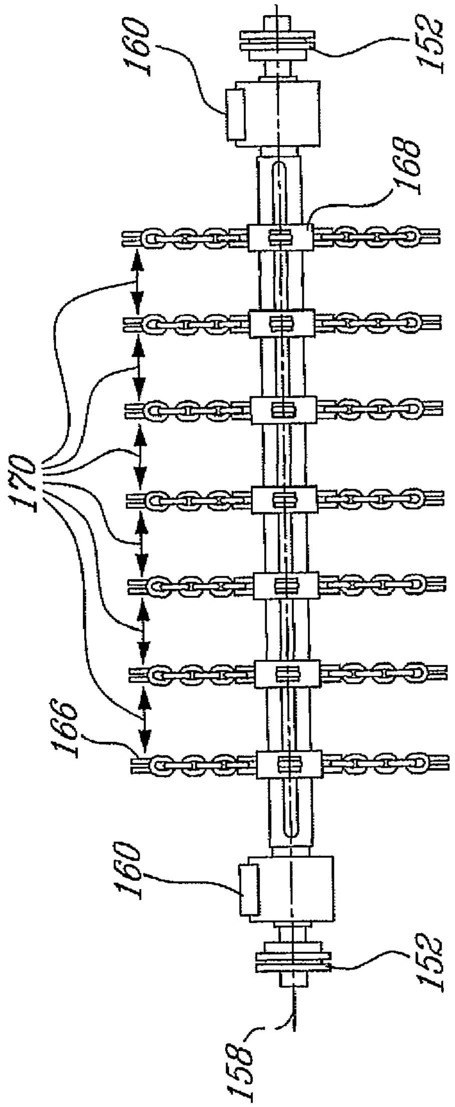
Figure 23C:
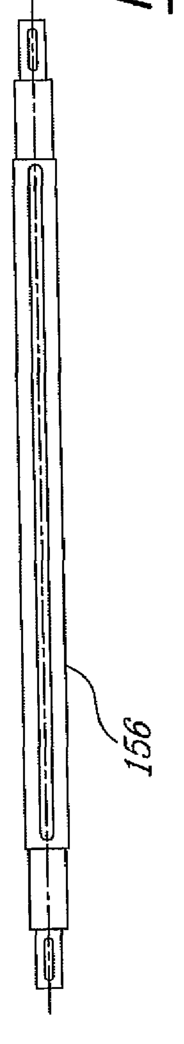
Figure 24B:
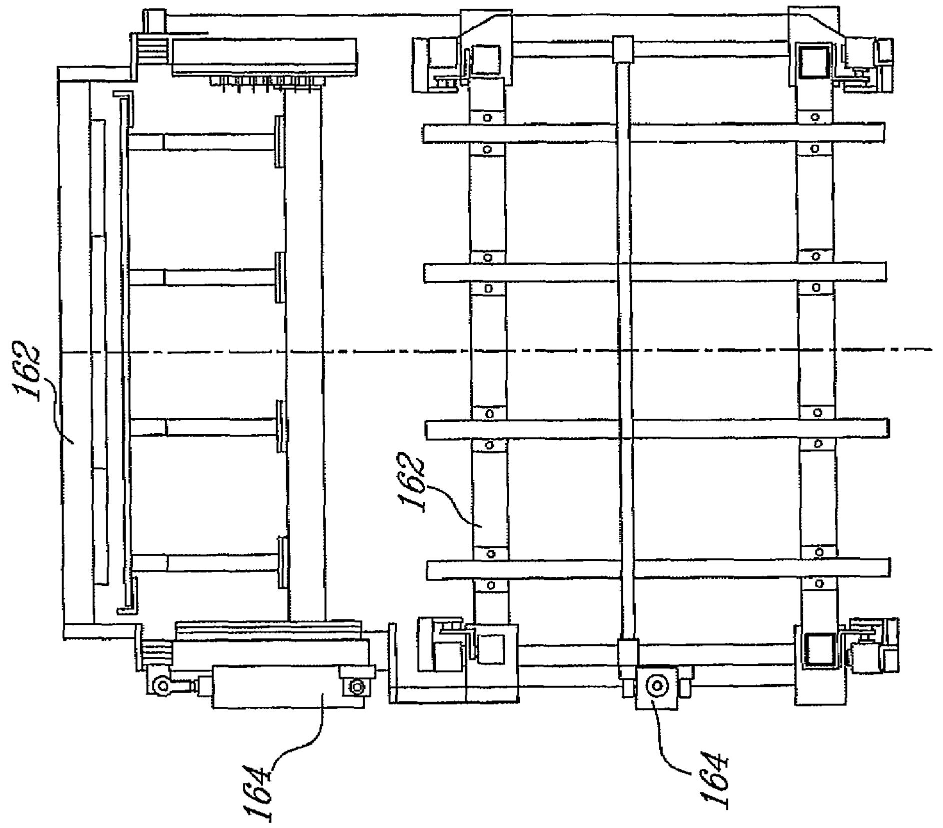
FIG. 24 is a combine side and front elevational views and top plan view of a portion of the embodiment depicted on FIG. 17
Figure 24A:
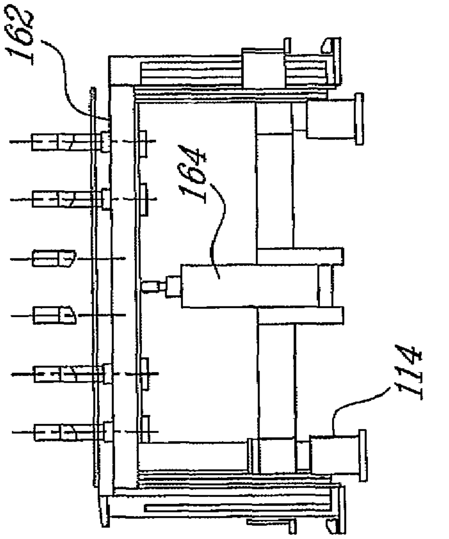

Now referring to FIG. 19, it can be appreciated that the tool holder 138 includes two members sliding one on the other to provide a telescopic mechanism. The third motor 122 influences the length of the tool holder 138 by rotating a screw 132. The movement of the screw 132 moves the internal wall 136 affixed inside the internal member of tool holder 138. The electric motor 122 is connected to the outside member of the tool holder 138 as opposed to the internal wall 136 that is welded into the internal member of the tool holder 138.

It is to be understood that the invention is not limited in its application to the details of construction and parts illustrated in the accompanying drawings and described hereinabove. The invention is capable of other embodiments and of being practised in various ways. It is also to be understood that the phraseology or terminology used herein is for the purpose of description and not limitation. Hence, although the present invention has been described hereinabove by way of embodiments thereof, it can be modified, without departing from the spirit, scope and nature of the subject invention as defined in the appended claims.

What is claimed is:

1. An apparatus for artificially aging the surface texture of pre-cast cementitious building blocks, said apparatus comprising:

a press and mould apparatus for pressing cementitious material into pre-cast building blocks of the type which are pre-cast in arrays by pressing cementitious material in a mould which rests on a support and lifting off the mould to reveal the pre-cast building block arrays in predetermined spaced apart relationships, each of said blocks having a bottom surface resting on the support, having side walls and having a top surface;

a retractable block immobilizing element adjacent to said press and mould apparatus, said retractable block immobilizing element being adapted to engage a portion of the block arrays and to immobilize the block arrays relative to both the support and ground while exposing a portion of the top surface and side walls to a movable tool for artificially aging said top or side walls of the blocks; and at least one movable impact tool for artificially aging the blocks by subjecting the exposed surfaces of the blocks to the repeated impacts of an aging tool, said movable impact tool being movable in at least one longitudinal axis along the block arrays when the immobilizing element immobilizes the block arrays relative to both the support and the ground.

2. The apparatus according to claim 1, wherein the retractable block immobilizing element is adapted to simultaneously engage a portion of the top surface of each block so that the retractable block immobilizing element firmly presses the blocks against the support, the block immobilizing element comprising a pattern of parallel bars configured and shaped to releasably press against the top surface of each block thereby immobilizing them.

3. The apparatus according to claim 2, wherein the parallel bars are interconnected.

4. The apparatus according to claim 3, wherein the parallel bars are interconnected at each of their longitudinal ends by a pair of end bars disposed substantially at right angles to the parallel bars.

5. The apparatus according to claim 1, wherein the block immobilizing element is mounted to an actuator so as to move the block immobilizing element down to a block engaging position and up to a block disengaging position.

6. The apparatus according to claim 5, wherein the block immobilizing element is mounted to at least one other actuator to allow multiple block engaging positions of the block immobilizing element, so as to expose other portions of the block surfaces to the aging tool.

7. The apparatus according to claim 1, wherein the at least one movable impact tool is a rotary impact tool.

8. The apparatus according to claim 7, wherein the rotary impact tool is rotatably mounted on a tool holder and wherein the tool holder is movable between positions where the rotary impact tool impacts and ages the exposed surfaces of the blocks and positions where the rotary impact tool does not impact the exposed surfaces of the blocks.

9. The apparatus according to claim 8, wherein the tool holder is movable in x-y-z coordinates by means of actuators mounted to a frame.

10. The apparatus according to claim 9, further comprising automation means wherein a predetermined or random sequence of artificial aging patterns are conducted on the exposed surfaces of immobilized blocks.

* * * * *